United States Patent
Noro et al.

(10) Patent No.: US 9,875,517 B2
(45) Date of Patent: Jan. 23, 2018

(54) DATA PROCESSING METHOD, DATA PROCESSING APPARATUS, AND STORAGE MEDIUM

(71) Applicant: FUJITSU LIMITED, Kawasaki-shi, Kanagawa (JP)

(72) Inventors: Masaaki Noro, Kawasaki (JP); Takeo Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 97 days.

(21) Appl. No.: 14/631,173

(22) Filed: Feb. 25, 2015

(65) Prior Publication Data

US 2015/0301585 A1  Oct. 22, 2015

(30) Foreign Application Priority Data

Apr. 22, 2014 (JP) ................................. 2014-088101

(51) Int. Cl.
G06F 1/32 (2006.01)
G06T 1/20 (2006.01)

(52) U.S. Cl.
CPC .............. *G06T 1/20* (2013.01); *G06F 1/3243* (2013.01); *G06F 1/3237* (2013.01); *G06T 2200/28* (2013.01); *Y02B 60/1239* (2013.01)

(58) Field of Classification Search
None
See application file for complete search history.

(56) References Cited

U.S. PATENT DOCUMENTS

| 8,743,123 B2* | 6/2014 | Watanabe ............... G06T 15/40 345/419 |
| 2004/0125110 A1 | 7/2004 | Kohda et al. |
| 2005/0024365 A1 | 2/2005 | Ohba |
| 2013/0125130 A1 | 5/2013 | Stubbs et al. |
| 2014/0184619 A1* | 7/2014 | Kim .......................... G06T 1/20 345/519 |
| 2014/0184629 A1* | 7/2014 | Wyatt .................... G09G 5/393 345/547 |

FOREIGN PATENT DOCUMENTS

| JP | 2002-278526 | 9/2002 |
| JP | 2005-62798 | 3/2005 |
| JP | 2005-92863 A | 4/2005 |

OTHER PUBLICATIONS

Office Action dated Nov. 14, 2017 in Japanese Patent Application No. 2014-088101 (with English translation).

* cited by examiner

*Primary Examiner* — Kee M Tung
*Assistant Examiner* — Yanna Wu
(74) *Attorney, Agent, or Firm* — Oblon, McClelland, Maier & Neustadt, L.L.P.

(57) ABSTRACT

A data processing method performed by a first processor configured to control a second processor that performs a process of creating an image and has a plurality of operation modes with different power consumption levels, the data processing method includes setting a number related to a second period following a first period based on a number of first images created by the second processor during the first period; and switching an operation mode of the second processor to an operation mode in which power consumption is lower than a power consumption of an operation mode during creating the image, among the plurality of operation modes, when the number of second images created during the second period reaches the set number.

14 Claims, 41 Drawing Sheets

FIG. 32

| VALUE STORED IN STATE STORAGE UNIT | STATE | CONDITION |
|---|---|---|
| 1 | FIRST STATE | RECEIVE Vsync NOTIFICATION FROM SYNTHESIS PROCESSING UNIT |
| 2 | SECOND STATE | RECEIVE COMPLETION NOTIFICATION FROM COMPLETION DETERMINATION UNIT |
| 3 | THIRD STATE | RECEIVE TERMINATION NOTIFICATION FROM GRAPHIC DATA PROCESSING UNIT IN SECOND STATE |
| 4 | FOURTH STATE | RECEIVE START NOTIFICATION FROM GRAPHIC DATA PROCESSING UNIT DRIVER IN THIRD STATE |

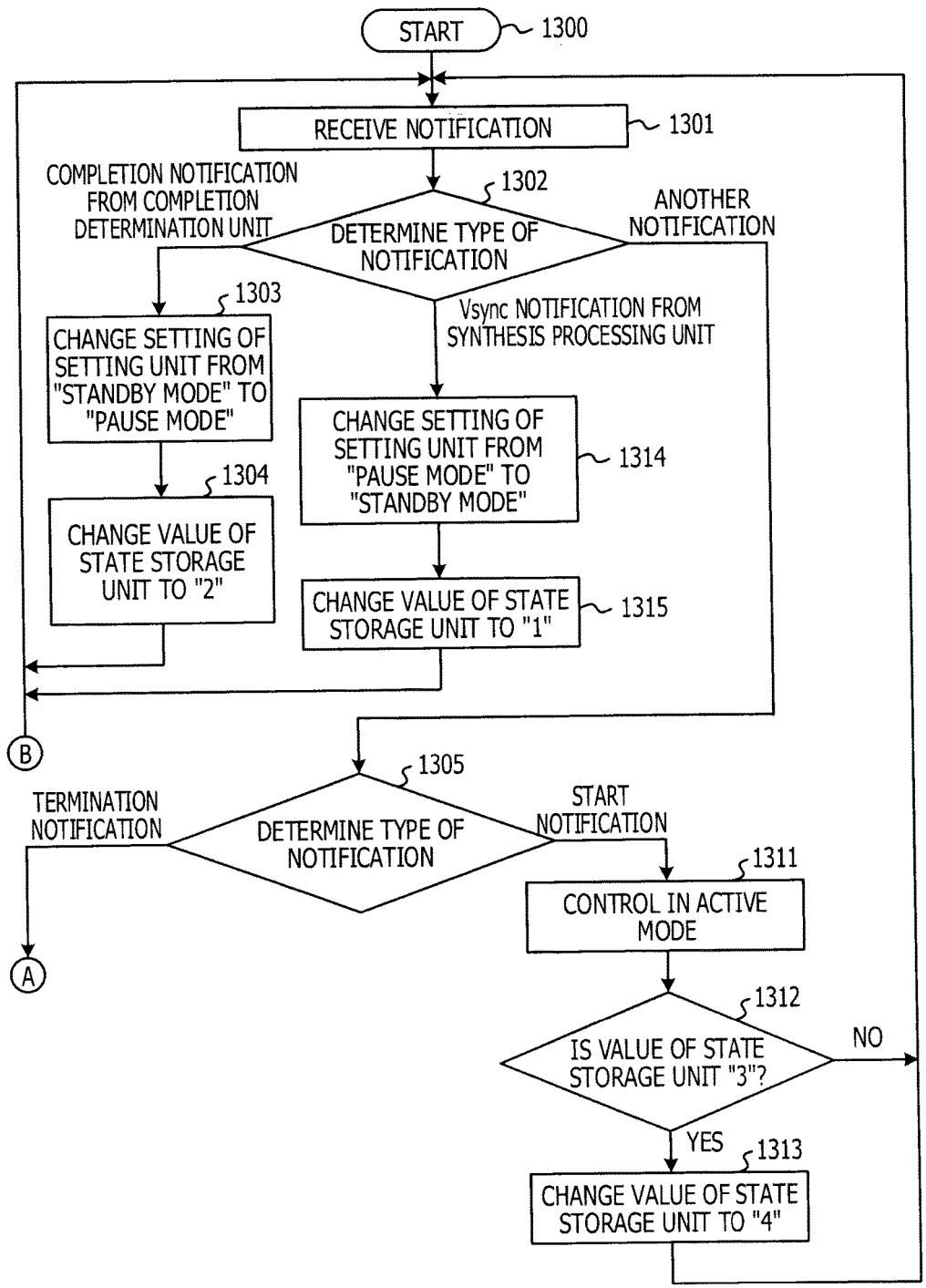

DATA PROCESSING METHOD, DATA PROCESSING APPARATUS, AND STORAGE MEDIUM

CROSS-REFERENCE TO RELATED APPLICATION

This application is based upon and claims the benefit of priority of the prior Japanese Patent Application No. 2014-088101, filed on Apr. 22, 2014, the entire contents of which are incorporated herein by reference.

FIELD

The embodiments discussed herein are related to a data processing method, a data processing apparatus, and a storage medium.

BACKGROUND

In portable terminals such as a notebook type computer or a smartphone, a technique of suppressing power consumption in order to maintain driving using a battery has been developed. Power consumed by a portable terminal includes power consumption of a processor that performs data creation of an image to be displayed on a display. For example, when an application software running on a smartphone updates an image on a display, a processor included in the smartphone performs a process of creating new image data. Then, the processor displays a new image on the display based on the created image data. The updating of the image is performed in synchronization with synchronization signals, such as vertical synchronization signals, which are generated at predetermined time intervals.

A technique of suppressing power consumption of a processor that creates image data to be updated in synchronization with a synchronization signal includes a technique of switching an operation mode of a processor to a low power consumption mode when a process of creating image data to be performed is completed before the next synchronization signal is sent. Thereby, it is possible to reduce power consumption during a period until the next synchronization signal is sent (for example, see Japanese Laid-open Patent Publication No. 2005-62798).

Japanese Laid-open Patent Publication No. 2005-62798 discloses that the processor is shifted to a power saving mode when the processing of image data to be processed within a unit rendering period is completed prior to the completion of the unit rendering period. However, Japanese Laid-open Patent Publication No. 2005-62798 mentioned above does not disclose a specific method of recognizing that the processing of image data to be processed is completed. Therefore, it may not be said that the method disclosed in Japanese Laid-open Patent Publication No. 2005-62798 has sufficient convenience as a technique of suppressing power consumption.

SUMMARY

According to an aspect of the invention, a data processing method performed by a first processor configured to control a second processor that performs a process of creating an image and has a plurality of operation modes with different power consumption levels, the data processing method includes setting a number related to a second period following a first period based on a number of first images created by the second processor during the first period; and switching an operation mode of the second processor to an operation mode in which power consumption is lower than a power consumption of an operation mode during creating the image, among the plurality of operation modes, when the number of second images created during the second period reaches the set number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 32 is a diagram illustrating a relationship between a value stored in a state storage unit, a state corresponding to the value stored in the state storage unit, and a condition for recognizing each state, in the fourth embodiment;

FIG. 33 is a processing flow chart of the mode management unit according to the fourth embodiment;

DESCRIPTION OF EMBODIMENTS

First Embodiment

This embodiment discloses a specific method for determining that data processing related to screen creation to be processed within a period from a certain vertical synchronization signal (hereinafter, Vsync) to Vsync which is subsequently sent (hereinafter, a unit period) has been completed. It is possible to suitably recognize a period capable of pausing a processor by determining that the data processing related to screen creation has been completed. As a result, it is possible to suppress the power consumption of a display device.

Figure 1:
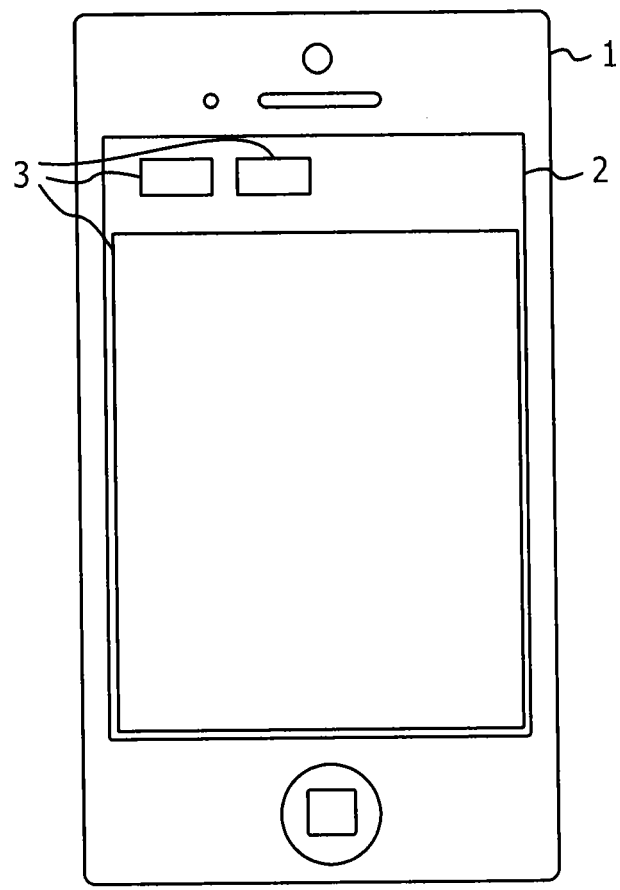
FIG. 1 is a diagram illustrating the definitions of terms used in a first embodiment.

FIG. 1 is a diagram illustrating the definitions of terms used in a first embodiment. FIG. 1 illustrates a portable terminal such as a smartphone, as a display device 1. An image displayed on the entirety of a display 2 which is a display unit of the display device 1 is referred to as a "screen". One "screen" is displayed on the display 2. When Vsync is sent 60 times per second, 60 "screens" per second are sequentially updated on the display. Here, in a state of a still image, the contents of the "screen" are not updated, and the "screens" having the same contents are displayed for a fixed period of time.

One "screen" includes pictures 3 which are individually drawn by pieces of application software (hereinafter, applications). Each of the pictures 3 drawn by the individual applications is referred to as an "image". In the embodiment illustrated in FIG. 1, each of the three applications displays an "image" within one "screen". The "screen" displayed on the display 2 is created by synthesizing the "images" drawn by the individual applications.

Figure 2:
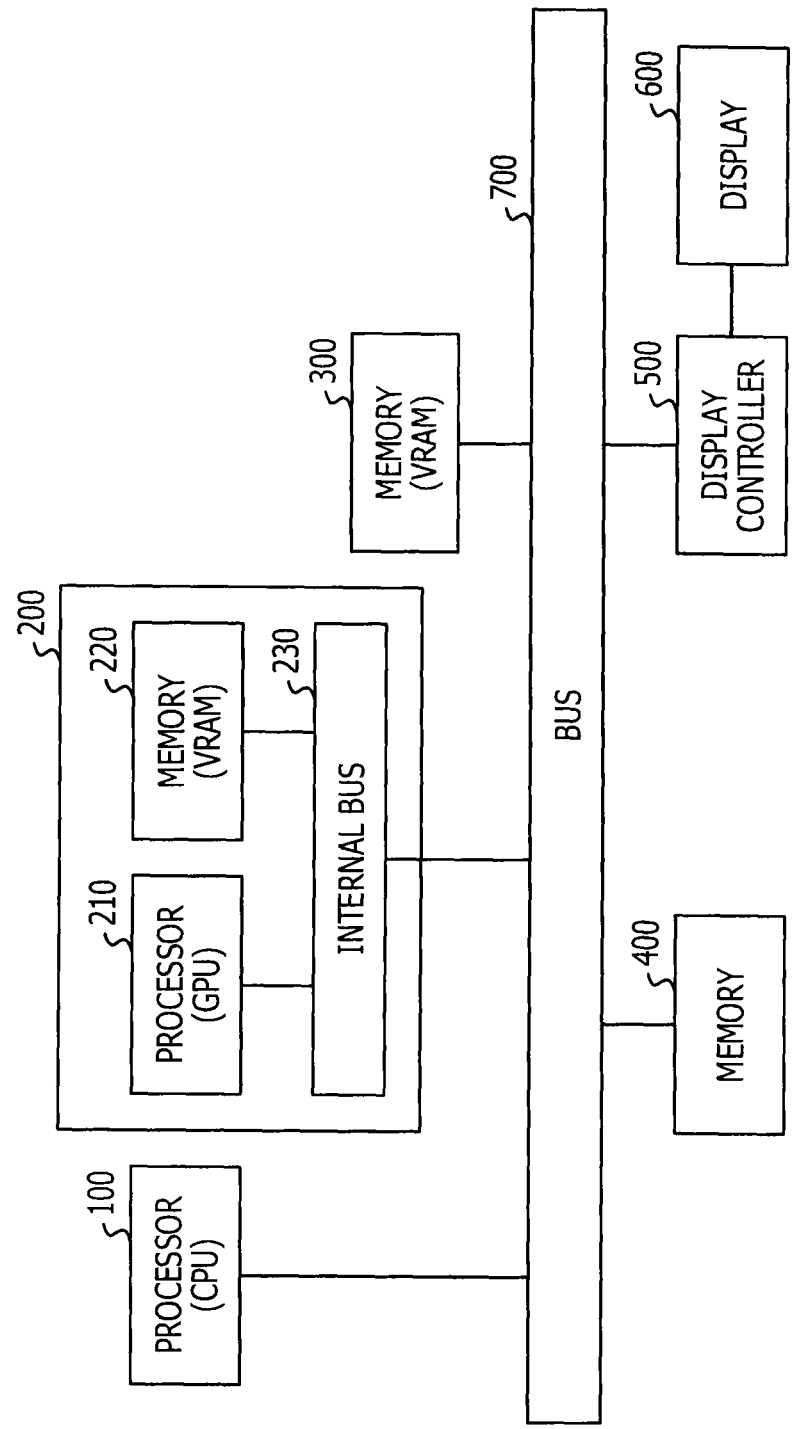
FIG. 2 is a hardware configuration diagram of a display device according to the first embodiment.

FIG. 2 is a hardware configuration diagram of the display device 1 according to the first embodiment. The display device 1 is a portable terminal such as, for example, a notebook type computer, a tablet computer, or a smartphone. The display device 1 includes a bus 700, an internal bus 230, a processor 100, a processor 210, a memory 220, a memory 300, a memory 400, a display controller 500, and a display 600. The processor 210 and the memory 220 are coupled to the bus 700 through the internal bus 230. The processor 100 performs the management and data processing of the entire display device 1. The memory 400 is used as a main memory of the display device 1. The processor 210 is a processor that mainly performs data processing related to the creation of an image and a screen. The processor 210 is referred to as a graphic processing unit (GPU). The memory 220 is a memory that mainly stores image data and screen data. The memory 220 is referred to as a video random access memory (VRAM). The memory 300 is a VRAM that mainly stores screen data. The display controller 500 displays a created screen on the display 600.

The processor 100 is an electronic circuit component such as a central processing unit (CPU), a micro processing unit (MPU), a digital signal processor (DSP), or a field-programmable gate array (FPGA). The processor 210 is an electronic circuit component such as a MPU, a DSP, or an FPGA. The processor 210 may be a CPU. The memories 220, 300, and 400 are electronic circuit components such as a dynamic random access memory (DRAM) or a static random access memory (SRAM). In the subsequent portions of this specification, for convenience of description, the processor 100 will be referred to as a CPU, and the processor 210 will be referred to as a GPU. For convenience of description, the memory 220 will be referred to as a first VRAM, and the memory 300 will be referred to as a second VRAM.

The CPU 100, the GPU 210, the first VRAM 220, and the internal bus 230 illustrated in FIG. 2 may be formed as a single semiconductor chip as a system on chip (SoC). For convenience of description, the GPU 210, the first VRAM 220, and the internal bus 230 will be collectively referred to as a graphic data processing unit 200 in this specification.

Figure 3:
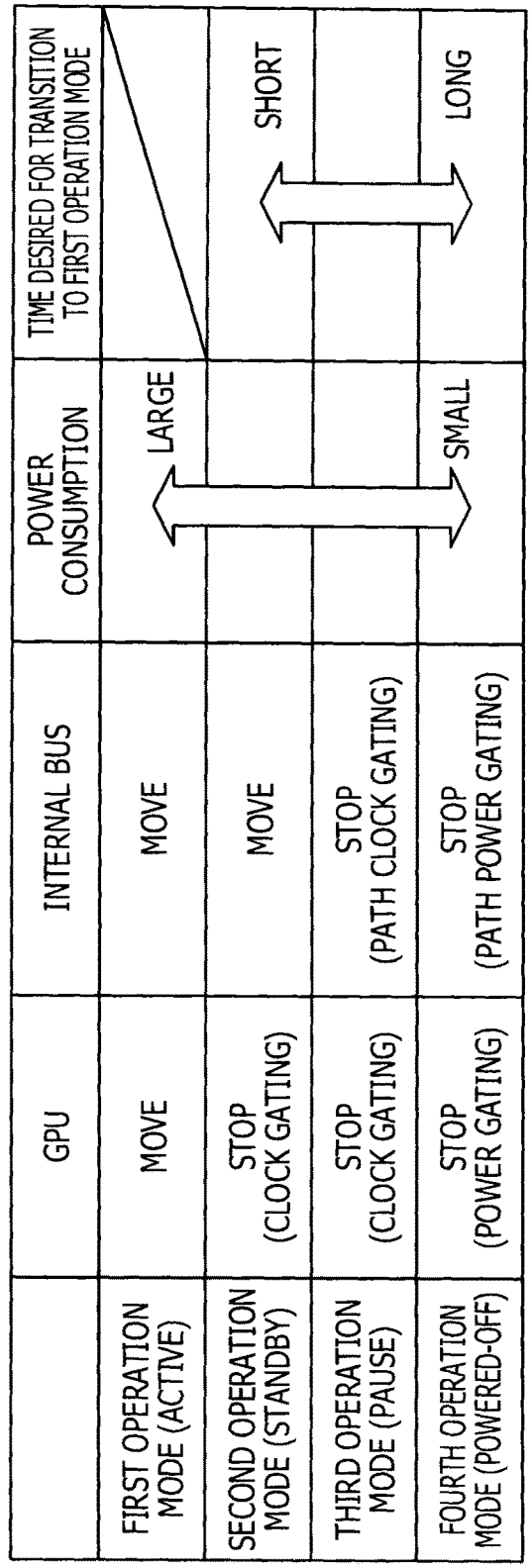
FIG. 3 is a diagram illustrating a relationship between an operation mode of a graphic data processing unit according to the first embodiment and power consumed by the graphic data processing unit.

FIG. 3 is a diagram illustrating a relationship between an operation mode of the graphic data processing unit 200 and power consumed by the graphic data processing unit 200. In this embodiment, four modes are illustrated as operation modes. A first operation mode is a mode in which both the GPU 210 and the internal bus 230 are operated. In this specification, the first operation mode is referred to as an "active mode". A second operation mode is a state where a clock supplied to the GPU 210 is stopped. In this state, the GPU 210 does not perform data processing. In this specification, the second operation mode is referred to as a "standby mode". In the second operation mode, a clock is supplied to the internal bus 230. The stopping of the clock is a meaning including both a case where a clock generation circuit serving as a clock supply source is stopped and a case of so-called clock gating in which a clock supply path is cut off with the clock generation circuit being operated. A third operation mode is a state where a clock supplied to the GPU 210 is stopped and a clock supplied to the internal bus 230 is also stopped. In this state, the GPU 210 does not perform data processing and also may not have access to the first VRAM 220. In this specification, the third operation mode is referred to as a "pause mode". A fourth operation mode is a state where the power supply to the GPU 210 is stopped and the power supply to the internal bus 230 is also stopped. In this specification, the fourth operation mode is referred to as a "powered-off mode". The stopping of power supply is a meaning including both a case where a power source circuit serving as a power supply source is stopped and a case of so-called power gating in which a power supply path is cut off with the power source circuit being operated.

As illustrated in FIG. 3, power consumed by the graphic data processing unit 200 is largest in the first operation mode and is smallest in the fourth operation mode, among the four operation modes. Time desired for the transition to the first operation mode is shortest in the second operation mode and is longest in the fourth operation mode. The four operation modes illustrated in FIG. 3 are examples for illustrating a plurality of operation modes having different power consumption levels. The four operation modes do not mean that the display device 1 necessarily has the operation modes disclosed here. The names of the respective operation mode do not limit the embodiment, and other names may be given.

Figure 4:
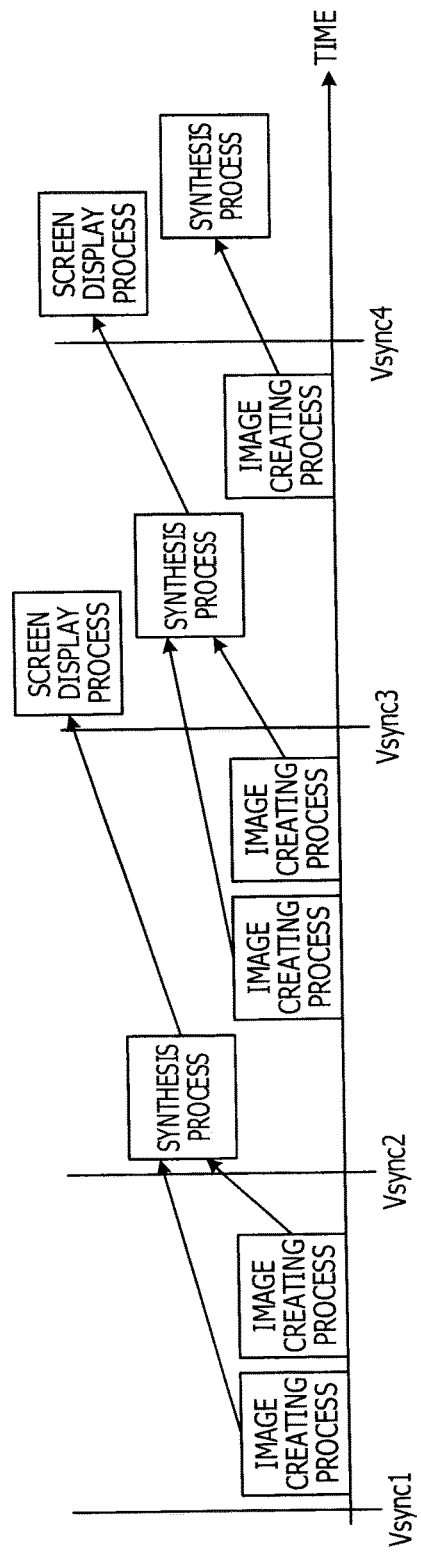
FIG. 4 is a diagram illustrating a processing procedure related to an image creating process, a synthesis process, and a screen display process according to the first embodiment.

A processing procedure related to an image creating process, a synthesis process, and a screen display process in the display device 1 will be described below based on FIG. 4. The display device 1 creates a screen of one frame in synchronization with Vsync at predetermined intervals and displays the screen on the display 600. FIG. 4 illustrates a flow of processing related to an image creating process, a synthesis process, and a screen display process which are performed for each Vsync that is sequentially sent, wherein a horizontal axis is set as a time axis. In this specification, the term "image creating process" used herein means a process of creating image data. The term "synthesis process" used herein means a process of synthesizing image data to thereby create screen data. The term "screen display process" used herein means a process of actually displaying screen data on the display 600.

As described in FIG. 1, data processing performed to create one screen includes data processing for creating individual images and data processing for synthesizing the created individual images to thereby create a screen. A procedure in which the data processing for creating images and the data processing for synthesizing the images are performed will be described with reference to FIG. 4. First, an image creating process is performed based on the generation of Vsync1. Here, an example in which a plurality of images creating processes are serially performed. For example, when a plurality of applications are running on the display device 1 and each of the plurality of applications is desired to update an image displayed on the display 600, each of the plurality of applications performs an image creating process. In the example illustrated in FIG. 4, a process of creating two images is performed. Image data generated by each of the plurality of applications through the image creating process is not displayed on the display 600 as it is. A synthesis process of superimposing the created image data on image data created by another application is performed. For this reason, the created image data is temporarily stored in the first VRAM 220.

Next, a synthesis process is performed based on the generation of Vsync2. Image data is created from the image data which is generated based on Vsync1 and is stored in the first VRAM 220 through the synthesis process. Screen data is stored in the first VRAM 220 and is then transmitted to the second VRAM 300 or is stored in the second VRAM 300 without being stored in the first VRAM 220. When each application further updates the image after the synthesis process is terminated, an image creating process is subsequently performed to thereby store new image data in the first VRAM 220. In the example illustrated in FIG. 4, a process of creating two images is performed.

Next, a screen display process is performed based on the generation of Vsync3. Specifically, the screen data generated based on Vsync2 and stored in the second VRAM 300 is displayed on the display 600. Further, a synthesis process is performed on the image data which is generated based on Vsync2 and is stored in the first VRAM 220. When the synthesis process is terminated, an image creating process is performed similarly. In this embodiment, an example in which a process of creating one image is performed in a unit period corresponding to Vsync3 is shown.

As illustrated in FIG. 4, the synthesis process and the image creating process are not performed so as to temporally overlap each other. This is because both the synthesis process and the image creating process are performed by the graphic data processing unit 200 including the GPU 210. In order to inhibit both the processes from competing with each other in the graphic data processing unit 200, the synthesis process is first performed and then the image creating process is performed when Vsync is sent. In addition, in order to inhibit a plurality of images creating processes from competing with each other in the graphic data processing unit 200, the processes are exclusively performed. The screen display process is a process which is performed by the display controller 500 based on the screen data stored in the second VRAM 300. The screen display process may be performed independently of the processing of the graphic data processing unit 200. Therefore, the screen display process may be set as a process which temporally overlaps the synthesis process or the image creating process.

As described above, in the order of data processing within a unit period, a process of creating screen data is first performed by the synthesis process, and then a process of creating image data is performed. Therefore, during the unit period, the GPU 210 does not perform data processing during a period from the termination of a process related to the creation of image data to the start of the next unit period.

However, the number of images created during the unit period is unspecified. For this reason, it may not be said that data processing related to the creation of one "image" is completed even when a process of creating data of one "image" is terminated. In such a situation, in order to pause the GPU 210, it is useful to establish a technique of recognizing that the image creating process has been completed. This embodiment discloses technical method for determining that the process of creating image data which is performed within a unit period is completed.

Figure 5:
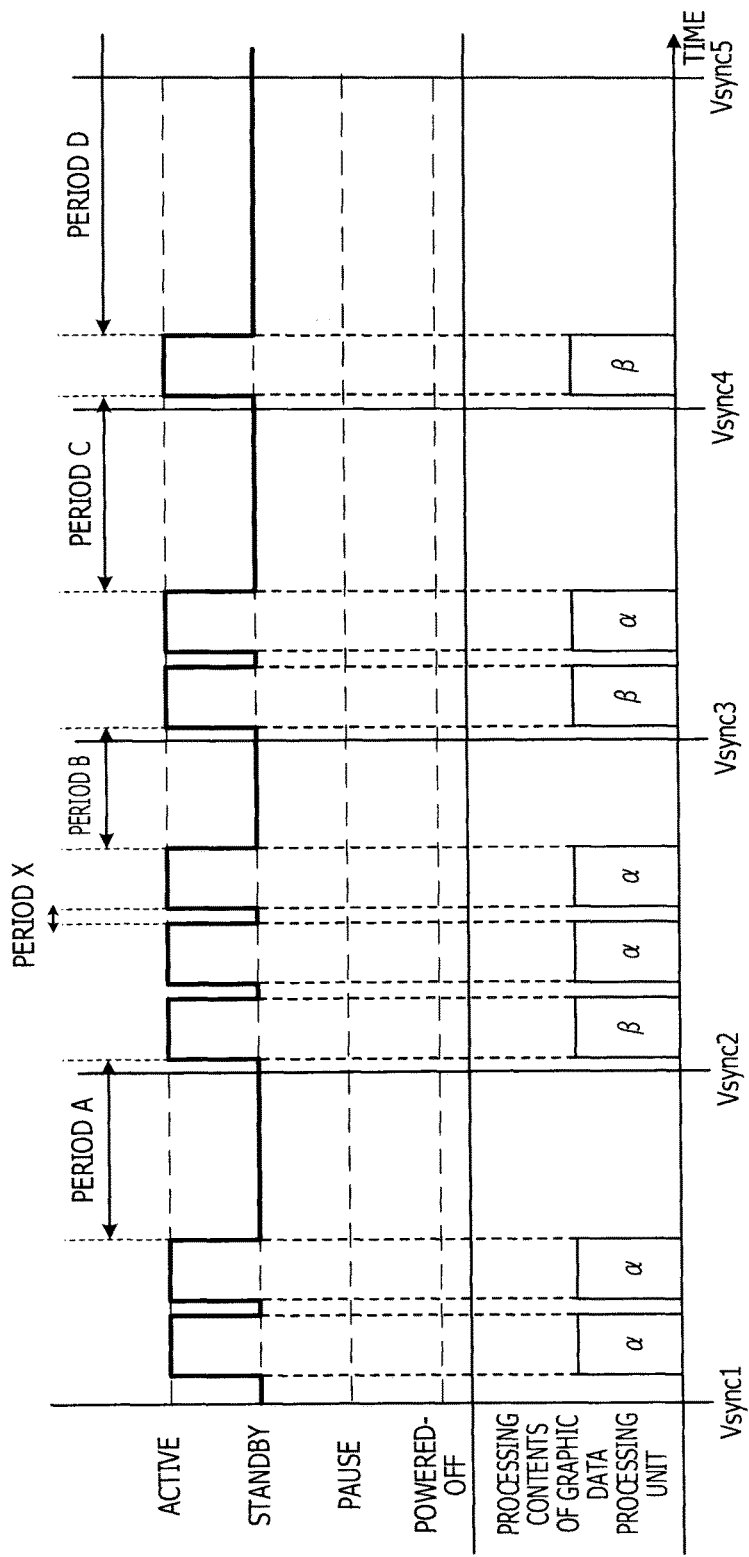
FIG. 5 is a diagram illustrating the process illustrated in FIG. 4 which is associated with the operation mode illustrated in FIG. 3.

FIG. 5 is a diagram illustrating the process illustrated in FIG. 4 which is associated with the operation mode illustrated in FIG. 3. In FIG. 5, "α" denotes an image creating process, and "β" denotes a synthesis process. This is the same as in FIG. 18, FIG. 20, and FIG. 31. During a period for which the graphic data processing unit 200 performs an image creating process, an operation mode of the graphic data processing unit 200 is an active mode. Even during a period for which the graphic data processing unit 200 performs a synthesis process, the operation mode is an active mode. On the other hand, during a period for which an image creating process and a synthesis process are not performed, the graphic data processing unit 200 is set to be in a standby mode. Here, in order to reduce power consumed by the graphic data processing unit 200, it is effective to control a period from the termination of the synthesis process and the image creating process to the generation of the next Vsync to be set to be in a pause mode or powered-off mode having lower power consumption than in a standby mode. Here, as illustrated in FIG. 3, it has to be considered that time desired for transition to an active mode is increased as an operation mode has lower power consumption. For example, in FIG. 4, it is assumed that the operation mode is shifted from an active mode to a pause mode at a point in time when a first image creating process performed based on Vsync2 is terminated. In this case, it is possible to reduce power consumption as compared to a case where the operation mode is set to a standby mode.

However, in the example illustrated in FIG. 5, the graphic data processing unit 200 has to perform another image creating process until the next Vsync3 is sent. Therefore, the operation mode has to be returned to the active mode from the pause mode. However, time desired to shift the pause mode to the active mode is longer than time desired to shift the standby mode to the active mode. Therefore, a period X written in FIG. 5 is increased, and thus a second image creating process may not be completed until Vsync3 is sent. Due such a delay in the image creating process, a synthesis process and an image display process which are performed by the next Vsync may be delayed, and the screen display of the display 600 may not be smoothly switched.

Consequently, in this embodiment, when the termination of an image creating process is detected in each Vsync, it is predicted whether or not there is another image creating process waiting for processing. When there is no another image creating process waiting for processing, that is, when it is determined that all image creating processes to be performed until the next Vsync is sent have been performed, an operation mode is shifted to a mode with lower power consumption than in a standby mode. Thereby, it is possible to reduce power consumption during at least a portion of a period (periods A, B, C, and D) for which the graphic data processing unit 200 does not perform data processing. On the other hand, when it is determined that there is another image creating process waiting for processing, the operation mode is set to a standby mode, and thus it is possible to inhibit the period X from being extended. A method of determining the presence or absence of another image creating process to be performed within a unit period, which is disclosed in this embodiment, includes a process of recording results of the number of images created within the past unit period, a process of predicting the number of images created within the next unit period based on the results of the number of created images, a process of counting the number of images which are actually created within the unit period, and a process of determining that all of the image creating processes have been terminated by the counted number of images reaching a predicted number.

Figure 6:
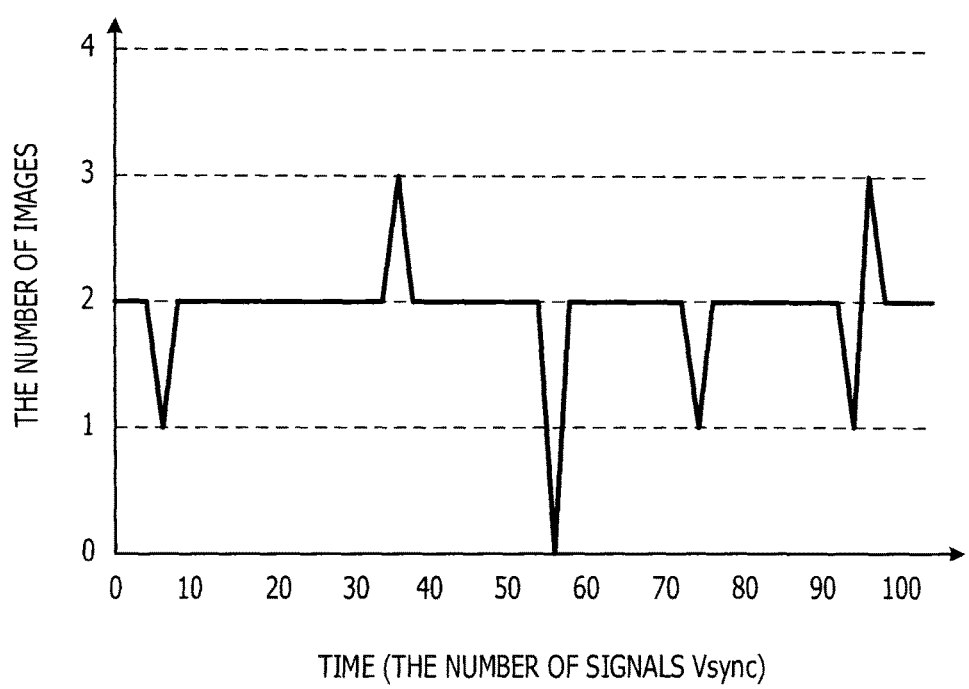
FIG. 6 is a diagram illustrating an example of measuring the number of images created for each unit period.

FIG. 6 is a diagram illustrating an example of measuring the number of images created for each unit period. In FIG. 6, a horizontal axis represents time (the number of signals Vsync), and a vertical axis represents the number of images. In this embodiment, the number of images may vary for each Vsync, but has a fixed value in many cases. In this manner, it is possible to predict the number of images created based on the generation of the next Vcync to a certain extent by recording the number of images created in response to each Vsync. In this embodiment, the number of images created during a unit period is predicted based on the past results, the coincidence between the number of images created during the unit period and the predicted number of images is detected, and the operation mode of the GPU 210 is controlled to be changed. Thereby, it is possible to reduce the power consumption of the graphic data processing unit 200 including the GPU 210.

Figure 7:
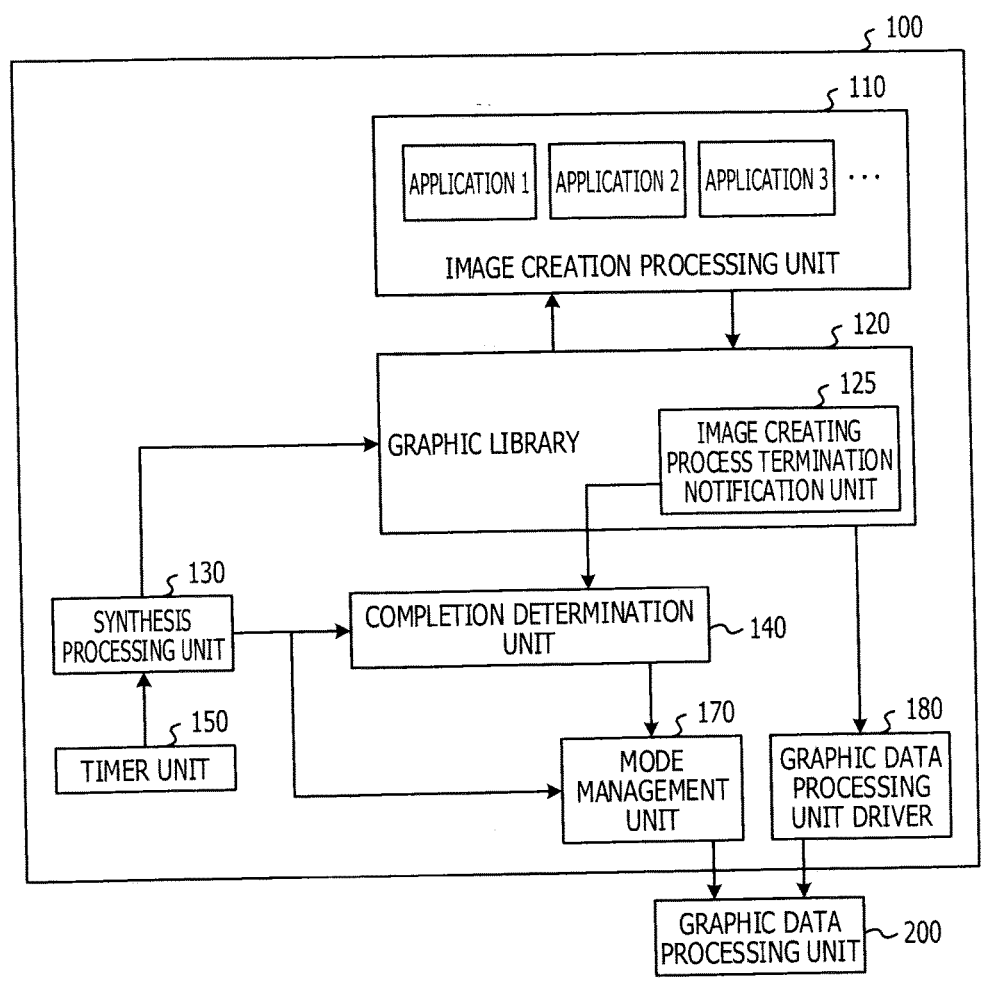
FIG. 7 is a functional block diagram of a CPU according to the first embodiment.

FIG. 7 is a functional block diagram of the CPU 100. The CPU 100 realizes functions illustrated in FIG. 7 by executing a predetermined program stored in another storage device capable of being accessed by the memory 400 or the CPU 100. The CPU 100 functions as an image creation processing unit 110, a graphic library 120, an image creating process termination notification unit 125, a synthesis processing unit 130, a completion determination unit 140, a timer unit 150, a mode management unit 170, and a graphic data processing unit driver 180.

When each application running on the display device 1 updates an image, the image creation processing unit 110 performs an image creating process using the graphic data processing unit 200 through the graphic library 120 and the graphic data processing unit driver 180 to thereby create new image data. The image creation processing unit 110 is realized by, for example, an application layer.

The timer unit 150 is realized by, for example, a kernel layer. The timer unit 150 sends Vsync at predetermined time intervals, and transmits Vsync to the synthesis processing unit 130. The synthesis processing unit 130 is realized by, for example, a service layer. When the synthesis processing unit 130 receives Vsync from the timer unit 150, the synthesis processing unit transmits a Vsync notification indicating the reception of Vsync to the completion determination unit 140 and the mode management unit 170. The completion determination unit 140 having received the Vsync notification specifies the number of images predicted to be created during a unit period corresponding to the Vsync as a predicted number and holds the predicted number. A method of specifying the predicted number will be described later. The mode management unit 170 is realized by, for example, a kernel layer. The mode management unit 170 controls the operation mode of the graphic data processing unit 200 based on the reception of the Vsync notification.

The synthesis processing unit 130 performs a process of synthesizing image data created by the image creation processing unit 110, based on the received Vsync. When the process of synthesizing image data is terminated, the synthesis processing unit 130 transmits a termination notification of the synthesis process to the graphic library 120. The graphic library 120 having received the termination notification of the synthesis process performs an image creating process in accordance with an instruction of the image creation processing unit 110.

The image creating process termination notification unit 125 provided in the graphic library 120 detects the termination of each image creating process. Then, the image creating process termination notification unit 125 transmits an image creating process termination notification to the completion determination unit 140. The completion determination unit 140 determines whether or not the number of image creation termination notifications received from the image creation termination notification unit 125, that is, an actual number which is the number of images that are actually created coincides with the predicted number which is previously registered. When the actual number of images coincides with the predicted number, the completion determination unit 140 determines that all of the image creating processes to be performed during a unit period corresponding to the Vsync have been completed. Then, the completion determination unit 140 transmits a completion notification to the mode management unit 170. The mode management unit 170 controls the operation mode of the graphic data processing unit 200 based on the received completion notification. The control of the operation mode of the graphic data processing unit 200 will be described later in detail.

Figure 8:
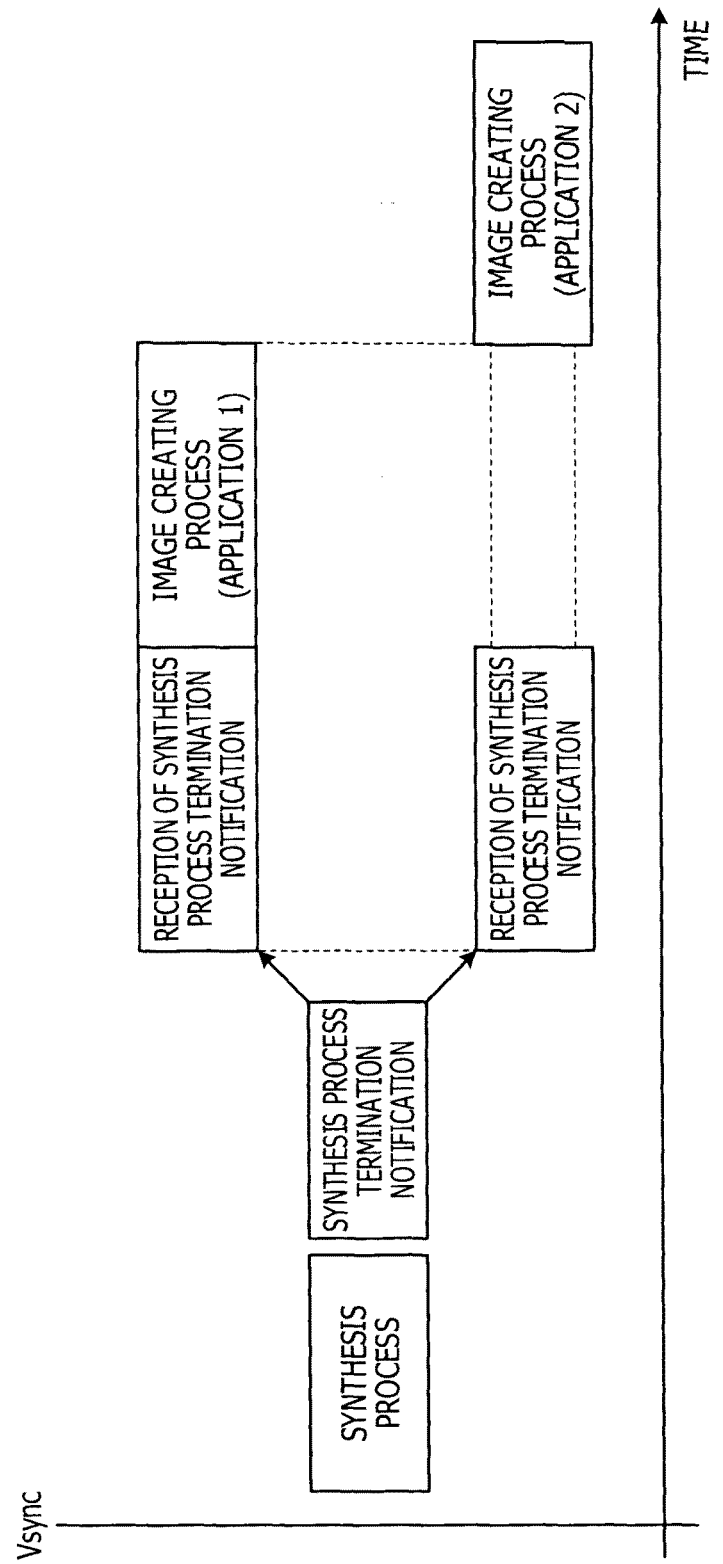
FIG. 8 is a diagram illustrating a processing timing in a case where a plurality of images are created in the first embodiment.

FIG. 8 is a diagram illustrating a processing timing in a case where a plurality of images are created based on a synthesis process termination notification from the synthesis processing unit 130. Following the synthesis process of the synthesis processing unit 130, the synthesis process termination notification is transmitted from the synthesis processing unit 130 to the graphic library 120. Then, the graphic library 120 performs an image creating process based on an instruction of the image creation processing unit 110. As mentioned above, the image creating process is performed by using the GPU 210 of the graphic data processing unit 200 in common. In the image creating process, an exclusive process for inhibiting plurality of images creating processes from competing on the GPU 210 is performed. In FIG. 8, first, an image creating process using an application 1 is performed. An example in which an image creating process using an application 2 is performed after the image creating process using the application 1 is terminated is shown.

Figure 9:
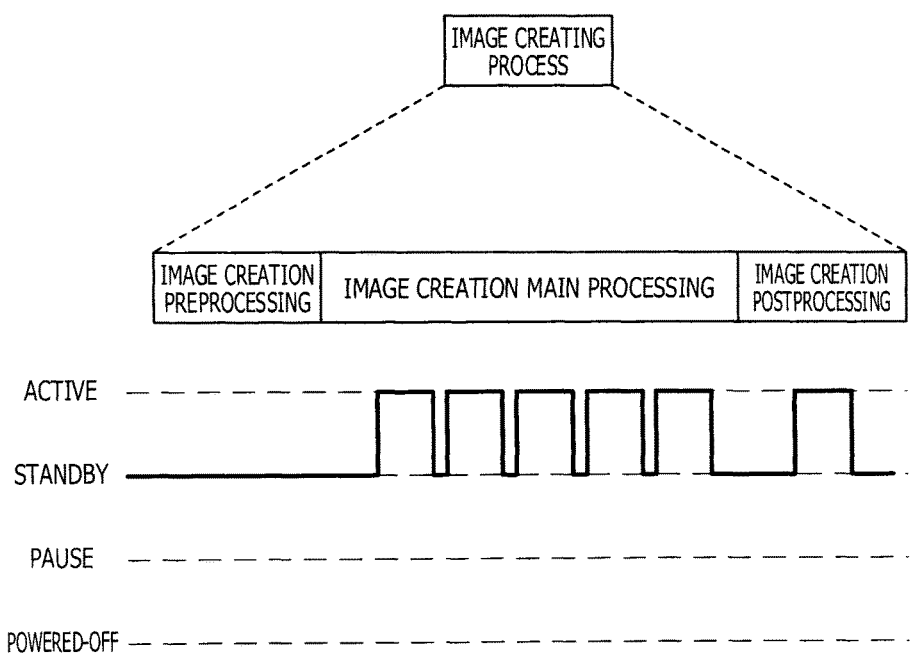
FIG. 9 is a diagram illustrating details of an image creating process using applications according to the first embodiment.

FIG. 9 is a diagram illustrating details of each image creating process performed by the graphic data processing unit 200. The image creating process includes image creation preprocessing, image creation main processing, and image creation postprocessing. Examples of the image creation preprocessing may include the selection of a picture serving as a background of an image, the erasure of data of a memory region to be used, and the like. When the image creation preprocessing is terminated, the graphic data processing unit 200 forms image data by the image creation main processing. The graphic data processing unit 200 stores the image data in a specific region of the first VRAM 220. The graphic data processing unit 200 performs the image creation postprocessing after the image creation main processing is terminated. The image creation postprocessing is, for example, an operation of switching a data storage region of the first VRAM 220. The switching of the data storage region refers to an operation of switching a data region within the first VRAM 220 that stores the image data created by the image creation processing unit 110. Specifically, when the image data created by the image creation processing unit 110 is stored in the first VRAM 220, first, the image creation processing unit 110 stores the image data in a first data storage region of the first VRAM 220 and then releases the first data storage region with respect to the synthesis processing unit 130. The image creation processing unit 110 stores image data to be subsequently created in a second data storage region of the first VRAM 220. The image creation processing unit 110 stores the image data in the second data storage region, releases the second data storage region with respect to the synthesis processing unit 130, and stores the image data in the first data storage region again. In this manner, after the image creation main processing is terminated, an operation of switching a data storage region of the first VRAM 220 is performed as the image creation postprocessing. Here, the image creation postprocessing is not limited to the operation of switching a data storage region, which is described here. As this will be described below, any type of image creation postprocessing may be applied to this embodiment as along as the image creation postprocessing may be used to detect the termination of the image creating process.

The lower part of FIG. 9 illustrates an example of an operation mode of the graphic data processing unit 200 in the image creation preprocessing, the image creation main processing, and the image creation postprocessing. In the image creation preprocessing, a period for which the GPU 210 does not perform data processing is set to a standby mode. In the image creation main processing, a period for which the GPU 210 performs data processing is set to an active mode. Also in the image creation postprocessing, the operation mode becomes active at a timing when the GPU 210 performs desired processing. Also in the middle of image creation main processing, the operation mode is set to a standby mode in a state where the GPU 210 completes the processing on data to be processed and the GPU 210 waits for data to be subsequently processed.

Figure 10:
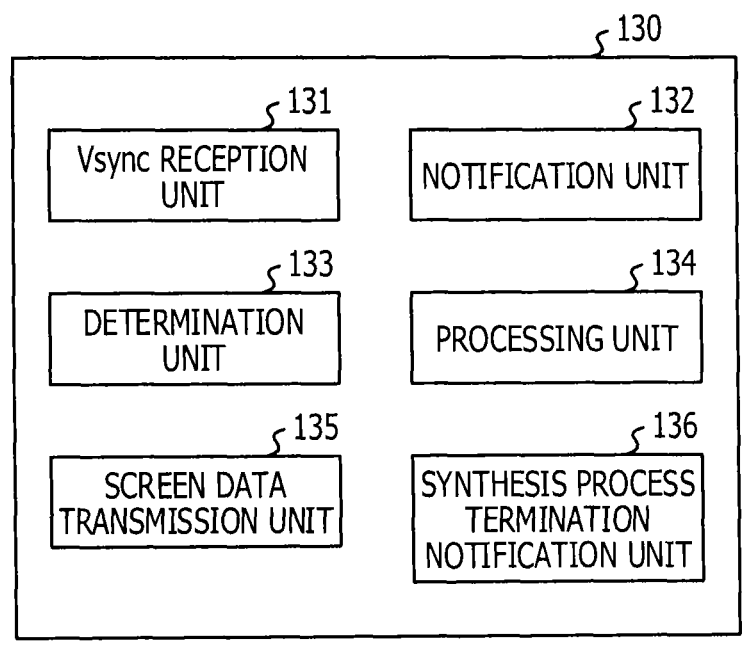
FIG. 10 is a functional block diagram of a synthesis processing unit according to the first embodiment.

FIG. 10 is a functional block diagram of the synthesis processing unit 130. The synthesis processing unit 130 functions as a Vsync reception unit 131, a notification unit 132, a determination unit 133, a processing unit 134, a screen data transmission unit 135, and a synthesis process termination notification unit 136. The Vsync reception unit 131 receives Vsync from the timer unit 150. The notification unit 132 transmits a Vsync notification to the completion determination unit 140 and the mode management unit 170 based on the reception of Vsync. The determination unit 133 determines whether or not there is image data to be synthesized, based on the reception of Vsync. When there is image data to be synthesized, the processing unit 134 performs a process of synthesizing an image to thereby create screen data and stores the screen data in the first VRAM 220. The screen data transmission unit 135 transmits the screen data stored in the first VRAM 220 to the second VRAM 300. The synthesis process termination notification unit 136 notifies the graphic library 120 that the synthesis process has been terminated.

Figure 11:
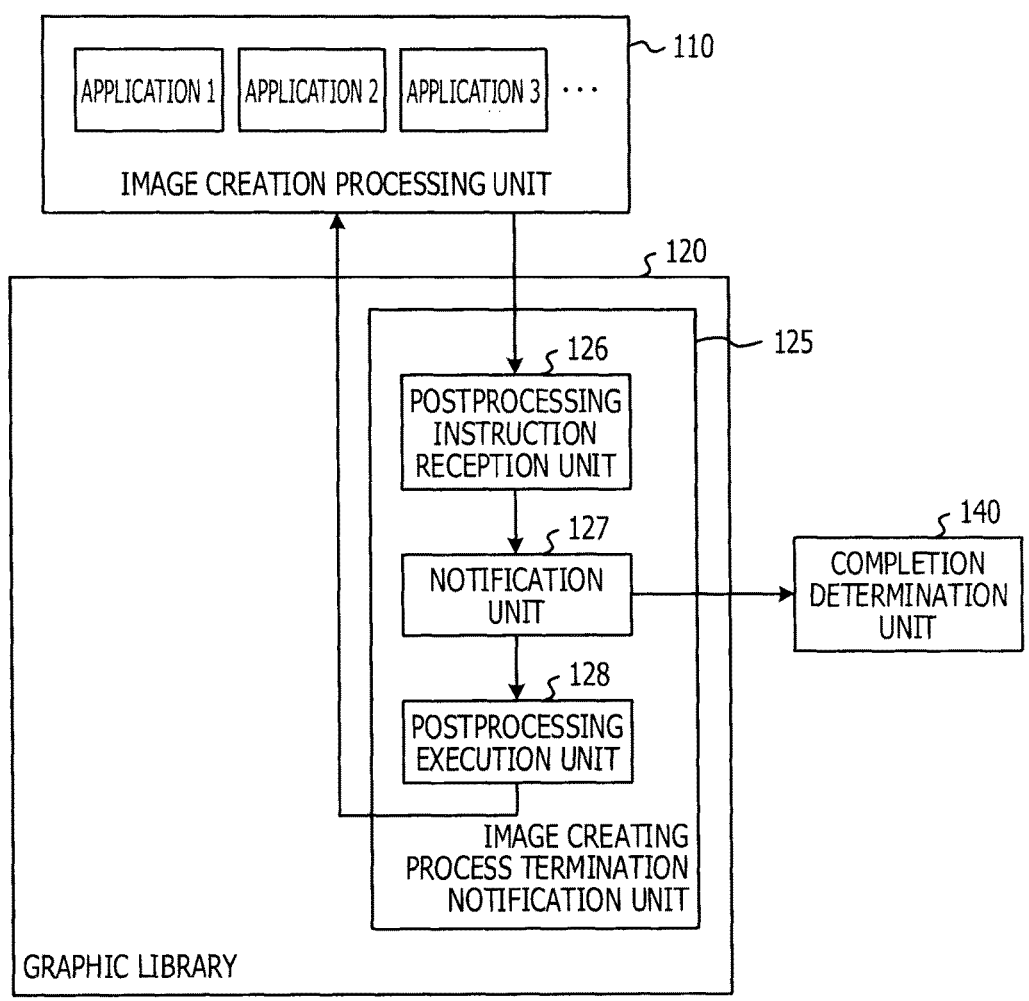
FIG. 11 is a functional block diagram of an image creating process termination notification unit according to the first embodiment.

FIG. 11 is a functional block diagram of the image creating process termination notification unit 125 provided in a library layer. The image creating process termination notification unit 125 includes a postprocessing instruction reception unit 126, a notification unit 127, and a postprocessing execution unit 128. After the image creation main processing illustrated in FIG. 10 is terminated, the image creation processing unit 110 transmits a postprocessing instruction to the image creating process termination notification unit 125. The postprocessing instruction is individually transmitted by an application that stores the created image data in a predetermined data storage region of the first VRAM 220. When each of a plurality of applications creates image data, each of the plurality of applications transmits a postprocessing instruction. When the postprocessing instruction reception unit 126 receives the postprocessing instruction from the image creation processing unit 110, the notification unit 127 notifies the completion determination unit 140 that the image creating process has been terminated. This notification is referred to as an image creation termination notification. The image creation termination notification is a notification indicating that individual pieces of image data are created, and is different from a completion notification performed by the completion determination unit 140 to be described later when all of the pieces of image data are created. After the notification unit 127 notifies the termination of image creation, the postprocessing execution unit 128 performs image creation postprocessing. Then, the postprocessing execution unit 128 notifies the image creation processing unit 110 that the image creation postprocessing has been performed.

Figure 12:
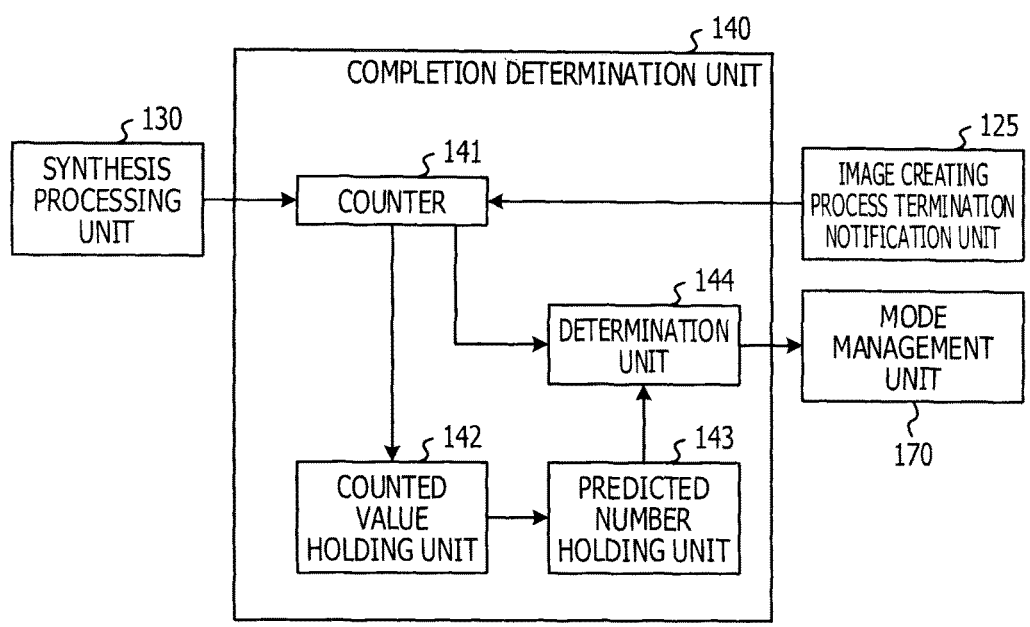
FIG. 12 is a functional block diagram of a completion determination unit according to the first embodiment.

FIG. 12 is a functional block diagram of the completion determination unit 140. The completion determination unit 140 functions as a counter 141, a counted value holding unit 142, a predicted number holding unit 143, and a determination unit 144. The counter 141 counts the number of image creating process termination notifications received from the image creating process termination notification unit 125. When the counter 141 receives a Vsync notification from the synthesis processing unit 130, the counter notifies the counted value holding unit 142 of a counted value at the point in time, and then initializes the counted value. Thereafter, the counter 141 counts the number of image creating process termination notifications received from the image creating process termination notification unit 125 again. The counted value holding unit 142 notifies the predicted number holding unit 143 of the held counted value. The predicted number holding unit 143 holds the value notified from the counted value holding unit 142 as a predicted number of images created within a unit period corresponding to the Vsync. In other words, in this embodiment, the number of images created during a certain unit period is adopted as a predicted number of images created during the next unit period. The counted value holding unit 142 and the predicted number holding unit 143 are collectively referred to as prediction unit.

The determination unit 144 compares the counted value of the counter 141, that is, an actual value which is the number of images that are actually created with the predicted number held by the predicted number holding unit 143. When the actual value reaches the predicted number, the determination unit 144 determines that all images to be created within a unit period have been created. Then, the determination unit 144 transmits a completion notification to the mode management unit 170.

Figure 13:
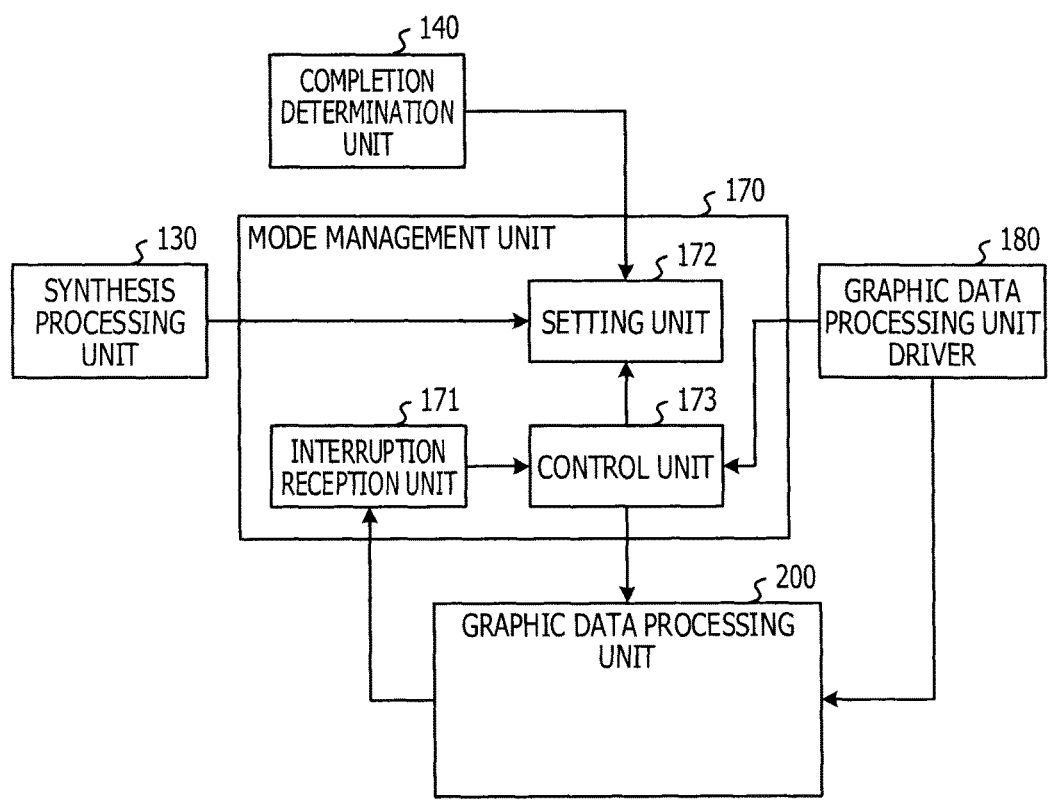
FIG. 13 is a functional block diagram of a mode management unit according to the first embodiment.

FIG. 13 is a functional block diagram of the mode management unit 170. The mode management unit 170 functions as an interruption reception unit 171, a setting unit 172, and a control unit 173. The interruption reception unit 171 receives an interruption notification of processing termination from the inside of the graphic data processing unit 200. For example, processing of data given to the GPU 210 of the graphic data processing unit 200 is performed. In a situation where there is no data to be processed by the GPU 210, the graphic data processing unit 200 transmits the processing termination to the mode management unit 170 as an interruption notification. Even when the image creation postprocessing illustrated in FIGS. 9 and 11 is terminated, an interruption notification of processing termination is given from the graphic data processing unit 200. When the interruption reception unit 171 receives the termination notification from the graphic data processing unit 200, the interruption reception unit instructs the control unit 173 to switch the operation mode of the graphic data processing unit 200.

When the control unit 173 receives an instruction to switch the operation mode, the control unit refers to the operation mode which is set in the setting unit 172. In which operation mode the graphic data processing unit 200 having terminated data processing is controlled is set in the setting unit 172. For example, when a "standby mode" is set in the setting unit 172, the control unit 173 switches the operation mode of the graphic data processing unit 200 to the standby mode.

When the graphic data processing unit driver 180 newly causes the graphic data processing unit 200 to perform data processing, the graphic data processing unit driver transmits desired data to the graphic data processing unit 200 and transmits the start of data processing to the control unit 173. Thereby, the control unit 173 shifts the operation mode of the graphic data processing unit 200 from a standby mode to an active mode. Accordingly, data processing in the graphic data processing unit 200 is started.

In such control, when a completion notification is given from the completion determination unit 140 in response to the image creation postprocessing of a final image creating process among image creating processes to be performed during a unit period corresponding to a certain Vsync, the setting unit 172 changes the set operation mode, for example, from a "standby mode" to a "pause mode". Thereafter, the graphic data processing unit 200 transmits a termination notification of processing, specifically, a termination notification of processing associated with the execution of the image creation postprocessing of the final image creating process to the interruption reception unit 171. The control unit 173 controls the operation mode of the graphic data processing unit 200 to be a pause mode in accordance with the set operation mode being a "pause mode", with reference to the setting unit 172. When all of the image creating processes performed in response to the respective signals Vsync are terminated by such a series of operations, it is possible to shift the operation mode of the graphic data processing unit 200 to a mode having lower power consumption.

Then, when a Vsync notification is transmitted from the synthesis processing unit 130 to the mode management unit 170 due to Vsync to be subsequently sent, the setting unit 172 writes back the set operation mode from the "pause mode" to the "standby mode". Thereafter, the graphic data processing unit driver 180 transmits desired data to the graphic data processing unit 200 and transmits the start of data processing to the control unit 173. Thereby, the control unit 173 shifts the operation mode from the pause mode to an active mode, and thus data processing in the graphic data processing unit 200 is performed. When the data processing in the graphic data processing unit 200 is terminated, the graphic data processing unit 200 transmits a termination notification of processing to the interruption reception unit 171. The control unit 173 controls the graphic data processing unit 200 to be in a standby mode instead of a pause mode by the setting of the setting unit 172 being written back to the "standby mode".

Figure 14:
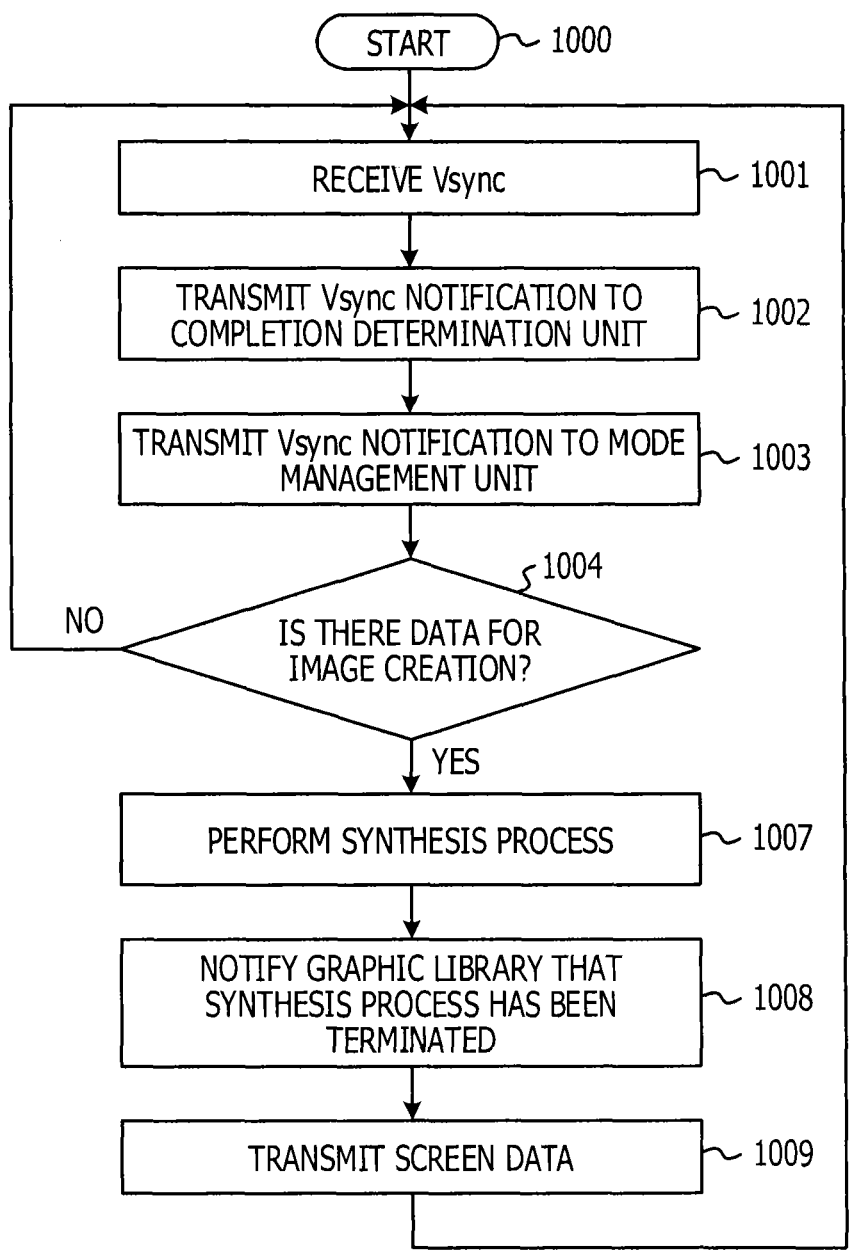
FIG. 14 is a processing flow chart of the synthesis processing unit according to the first embodiment.

FIG. 14 is a processing flow chart of the synthesis processing unit 130. The processing of the synthesis processing unit 130 is started by process 1000. In process 1001, the Vsync reception unit 131 receives Vsync from the timer unit 150. In process 1002, the notification unit 132 transmits a Vsync notification indicating the reception of Vsync to the completion determination unit 140. In process 1003, the notification unit 132 transmits a Vsync notification to the mode management unit 170. In process 1004, the determination unit 133 determines whether or not there is image data to be synthesized, that is, data for creating a screen. When there is no data for creating a screen, the processing returns to process 1001. On the other hand, when there is data for creating an image, the processing proceeds to process 1007. In process 1007, the processing unit 134 performs a synthesis process to thereby create screen data. In process 1008, the synthesis process termination notification unit 136 notifies the graphic library 120 that the synthesis process has been terminated. The graphic library 120 having received the notification indicating that the synthesis process has been terminated sequentially performs image creation in accordance with an instruction of the image creation processing unit 110. In process 1009, the screen data transmission unit 135 transmits the created screen data to the second VRAM 300, and the processing returns to process 1001.

Figure 15:
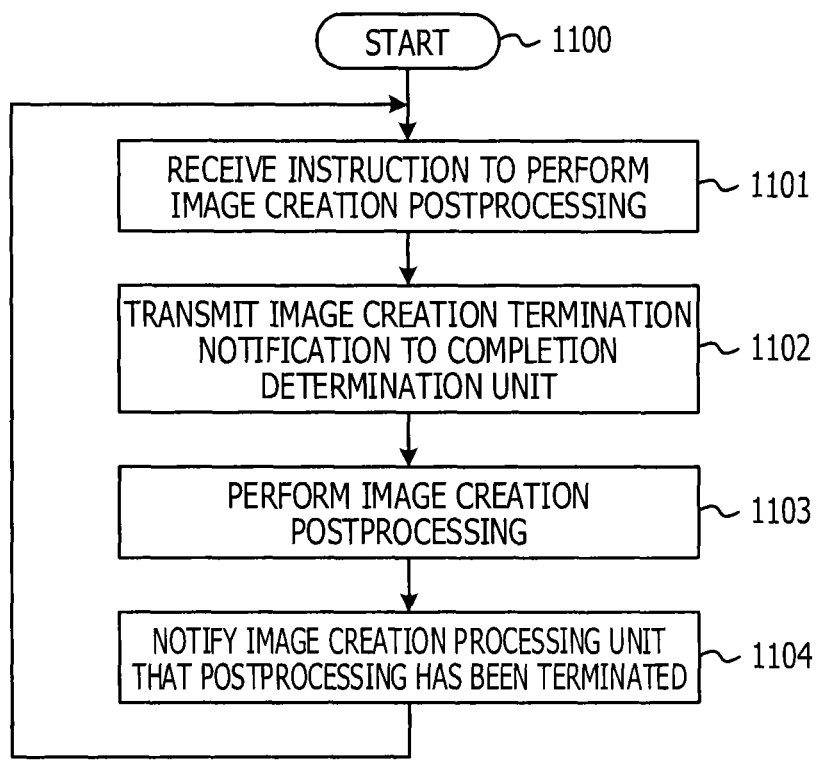
FIG. 15 is a processing flow chart of the image creation termination notification unit according to the first embodiment.

FIG. 15 is a processing flow chart of the image creation termination notification unit 125. The processing using the image creation termination notification unit 125 is started by process 1100. In process 1101, the postprocessing instruction reception unit 126 receives an instruction to perform image creation postprocessing from the image creation processing unit 110. In process 1102, the notification unit 127 transmits an image creation termination notification to the completion determination unit 140. In process 1103, the postprocessing execution unit 128 performs image creation postprocessing. In process 1104, the postprocessing execution unit 128 notifies the image creation processing unit 110 that the postprocessing has been terminated, and the processing returns to process 1101.

Figure 16:
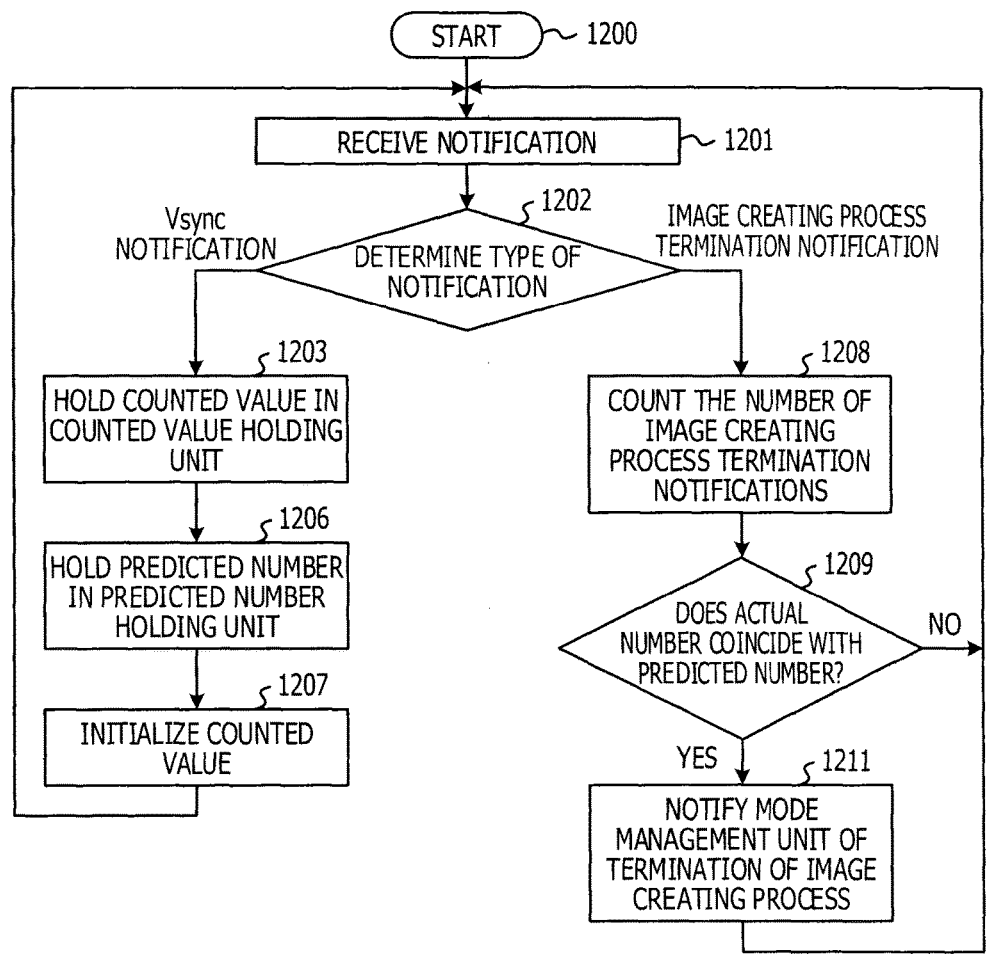
FIG. 16 is a processing flow chart of the completion determination unit according to the first embodiment.

FIG. 16 is a processing flow chart of the completion determination unit 140. The processing using the completion determination unit 140 is started by process 1200. In process 1201, the completion determination unit 140 receives a notification from the outside. In process 1202, the completion determination unit 140 determines the type of received notification. When the received notification is the Vsync notification transmitted from the synthesis processing unit 130, the processing proceeds to process 1203. On the other hand, when the received notification is the image creating process termination notification transmitted from the image creating process termination notification unit 125, the processing proceeds to process 1208. In process 1203, the counted value holding unit 142 holds a counted value of the counter 141 at a point in time when Vsync is received. In process 1206, the predicted number holding unit 143 holds a value registered in the counted value holding unit 142 as a predicted number of images created within a unit period. In process 1207, the counter 141 initializes the counted value, and the processing returns to process 1201.

When the notification received in process 1202 is an image creating process termination notification, the counter 141 counts the number of received image creating process termination notifications as an actual number of images that are actually created, in process 1208. In process 1209, the determination unit 144 determines whether or not the actual number counted by the counter 141 coincides with the predicted number held by the predicted number holding unit 143. When it is determined that the actual number does not coincide with the predicted number, the processing returns to process 1201. On the other hand, when it is determined that the actual number coincides with the predicted number, the processing proceeds to process 1211. In process 1211, the determination unit 144 notifies the mode management unit 170 of the termination of the image creating process, and the processing returns to process 1201.

Figure 17:
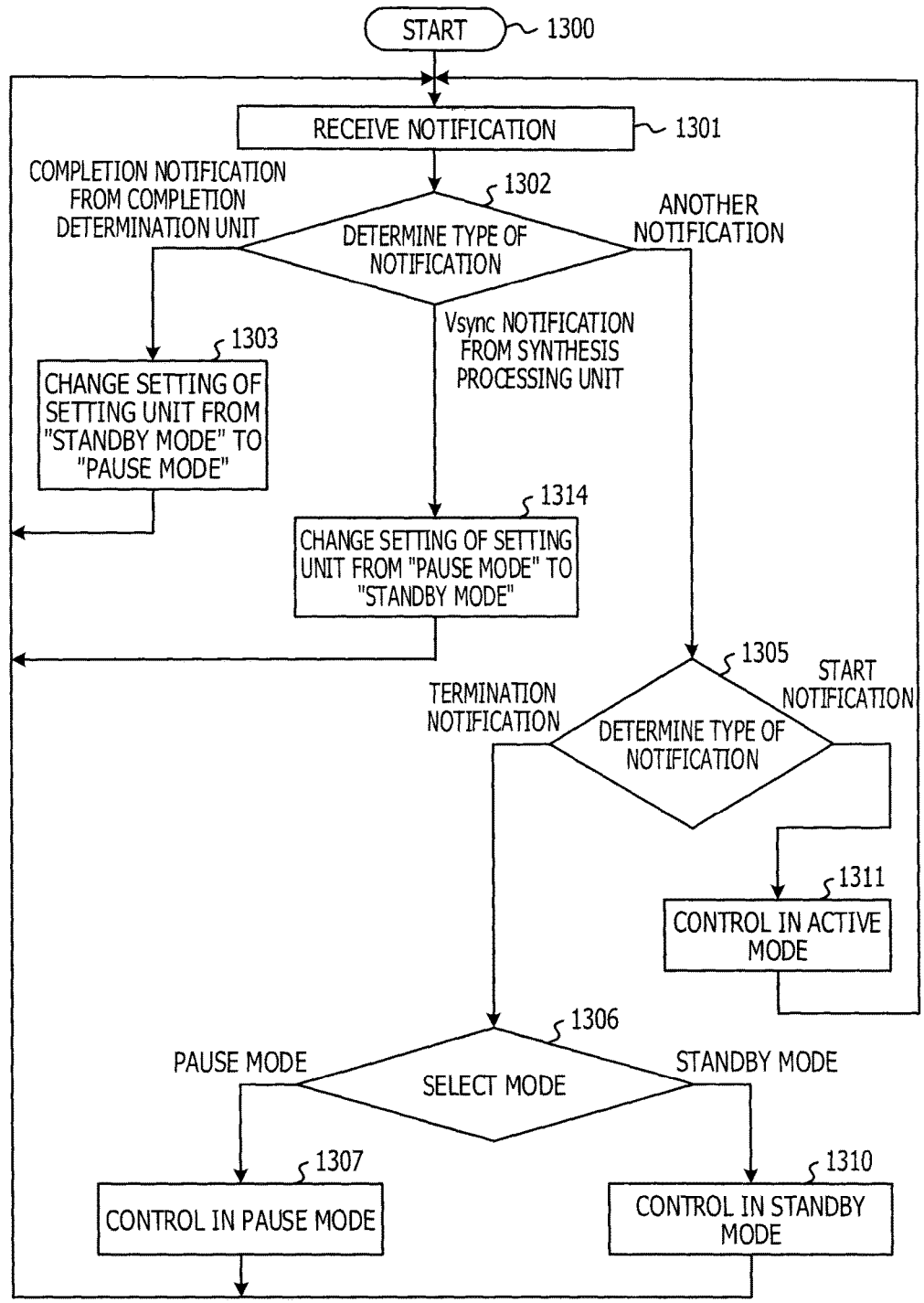
FIG. 17 is a processing flow chart of the mode management unit according to the first embodiment.

FIG. 17 is a processing flow chart of the mode management unit 170. The processing using the mode management unit 170 is started by process 1300. In process 1301, the mode management unit 170 receives a notification from the outside. In process 1302, the mode management unit 170 determines the type of received notification. When the received notification is a completion notification transmitted from the completion determination unit 140, the processing proceeds to process 1303. On the other hand, when the received notification is a Vsync notification from the synthesis processing unit 130, the processing proceeds to process 1314. When the received notification is any of other notifications, the processing proceeds to process 1305.

When the notification received from the mode management unit 170 is a completion notification from the completion determination unit 140, the setting unit 172 changes the setting of an operation mode from a "standby mode" to a "pause mode" in process 1303. At this time, only the setting contents of the setting unit 172 are changed, and the operation mode of the graphic data processing unit 200 does not transition to the pause mode. As this will be described later, the control unit 173 reads the setting contents of the setting unit 172 based on the interruption of the termination notification from the graphic data processing unit 200, and thus the operation mode of the graphic data processing unit 200 may transition to the pause mode.

In process 1305, the mode management unit 170 determines whether the received notification is a start notification of data processing from the graphic data processing unit driver 180 or a termination notification of data processing from the graphic data processing unit 200. When the notification is a start notification, the processing proceeds to process 1311. When the notification is a termination notification, the processing proceeds to process 1306. In process 1311, the control unit 173 controls the graphic data processing unit 200 in an active mode. The graphic data processing unit 200 processes data given from the graphic data processing unit driver 180. On the other hand, when the notification is a termination notification, the control unit 173 selects a control mode of the graphic data processing unit 200 based on the setting contents of the setting unit 172 in process 1306. When the operation mode set in the setting unit 172 is a "standby mode", the control unit 173 controls the graphic data processing unit 200 to be in a standby mode in process 1310, and the processing returns to process 1301. On the other hand, when the operation mode set in the setting unit 172 is a "pause mode", the control unit 173 controls the graphic data processing unit 200 to be in a pause mode in process 1307, and the processing returns to process 1301.

In process 1302, when the notification is the Vsync notification from the synthesis processing unit 130, the setting unit 172 writes back the set operation mode from a "pause mode" to a "standby mode" in process 1314, and the processing returns to process 1301.

In this manner, according to this embodiment, the number of images created during a unit period at the present time is predicted based on the number of images created during a unit period in the past. Then, it is detected that the number of images that are actually created coincides with the predicted number of images, and it is determined that all of the image creating processes have been terminated. During a period until the next Vsync is sent, the operation mode of the graphic data processing unit 200 is shifted to a mode capable of suppressing power consumption as compared with in a standby mode, for example, a pause mode.

Thereby, it is possible to suppress the power consumption of the graphic data processing unit 200 including the GPU 210.

Figure 18:
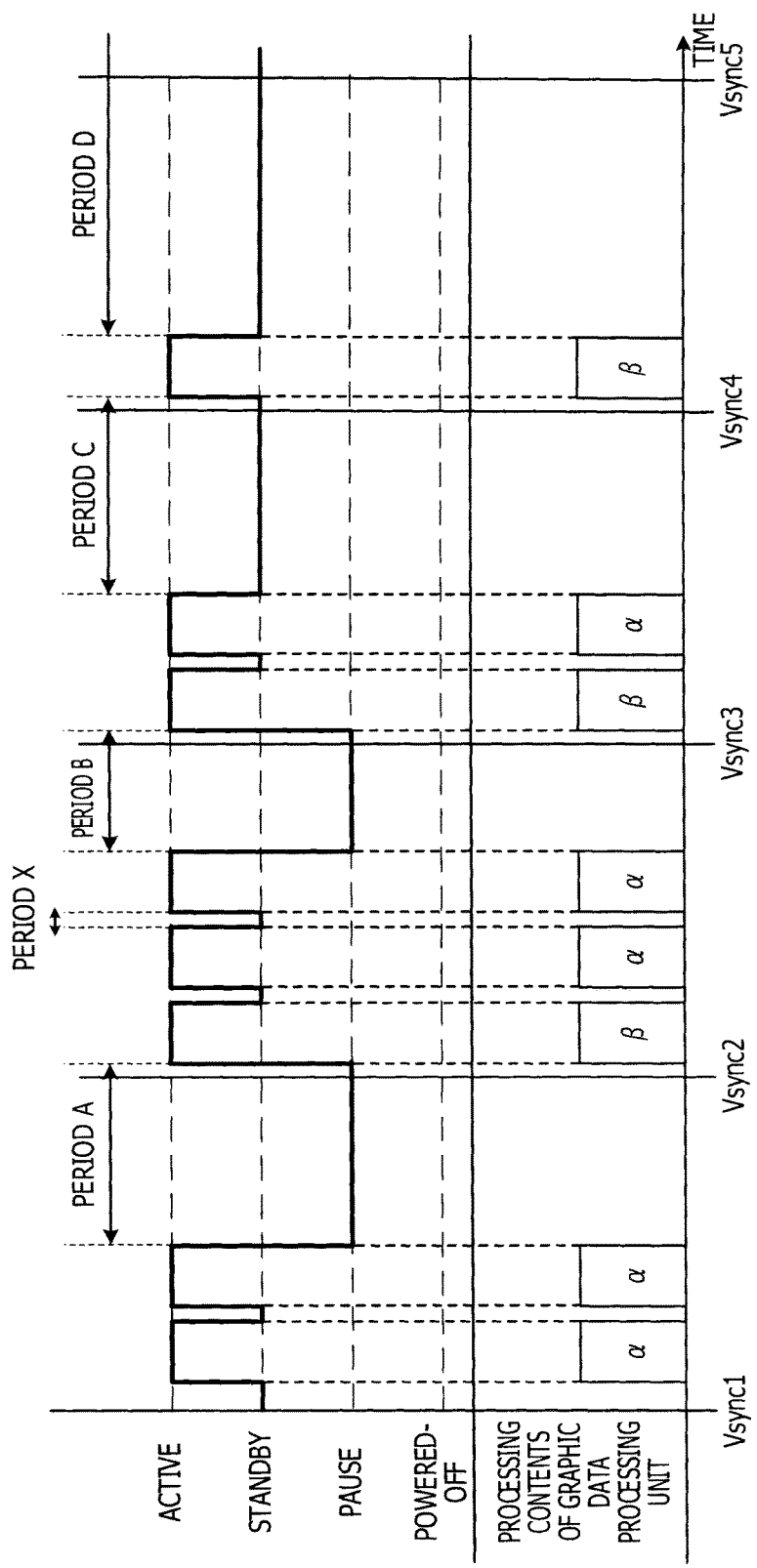
FIG. 18 is a diagram illustrating a state in the first embodiment, in a case where the operation mode of the graphic data processing unit is set to a pause mode when it is determined that data processing has been terminated.

FIG. 18 is a diagram illustrating a state in a case where the graphic data processing unit 200 is controlled to be in a pause mode until the next data processing is resumed after the creation of the predicted number of images is terminated. During a unit period between Vsync1 and Vsync2 (referred to as a first unit period), the number of images created during a unit period between Vsync2 and Vsync3 (referred to as a second unit period) is predicted to be "2" based on the creation of two images. Then, the graphic data processing unit 200 is controlled to be in a pause mode based on the creation of two images being terminated during the second unit period. Thereby, it is possible to suppress power consumption during a period B as compared with the control illustrated in FIG. 4. FIG. 18 illustrates a state where control is performed in a pause mode even during a period A on the assumption that a predicted number of "2" is set with respect to the first unit period.

Here, the number of images predicted to be created during a certain unit period may not coincide with the number of images that are actually created during the unit period. For example, in FIG. 18, the number of images created during a unit period between Vsync3 and Vsync4 (referred to as a third unit period) is predicted to be "2" based on the number of images created during the second unit period. However, the number of images created during the third unit period is "1", and thus the prediction is not right. In this case, an operation mode during a period C is controlled to be a standby mode instead of a pause mode.

In FIG. 18, time for which the pause mode transitions to the active mode and time for which the standby mode transitions to the active mode are not illustrated. However, as described in FIG. 3, the time for which the pause mode transitions to the active mode is longer than the time for which the standby mode transitions to the active mode. Therefore, the transition of the operation mode to the pause mode whenever the image creating process is terminated results in a delay in time until all of the image creating processes are terminated. Accordingly, in this embodiment, the delay in processing is suppressed by inhibiting the operation mode from transitioning to the pause mode until it is determined that all image creating processes to be performed within a unit period have been terminated.

The first embodiment has been described up to now, and a modified example of the first embodiment will be described. In the first embodiment, the operation mode of the graphic data processing unit 200 is set to be a pause mode when the number of created images reaches a predicted number. However, the operation mode may be shifted to a powered-off mode having power consumption lower than that in the pause mode. Alternatively, when an image is not updated over a certain period, for example, a predetermined number of unit periods, the operation mode of the graphic data processing unit 200 may be shifted to a pause mode or a powered-off mode. In addition, when a period until the next Vsync is sent is shorter than a predetermined threshold value at a point in time when the number of created images reaches a predicted number, control may be performed so as to maintain a standby mode without transitioning to a pause mode.

In operational examples illustrated in FIGS. 17 and 18, after the pause mode is set, transition to the active mode is performed at a timing when a synthesis process started after Vsync to be subsequently sent is started, but other operational examples may be considered. For example, when Vsync to be subsequently sent after transitioning to the pause mode, first, transition from the pause mode to the standby mode is performed based on the Vsync. Then, when the synthesis process is started, transition from the standby mode to the active mode may be performed. Thereby, it is possible to suppress a delay in a timing at which the synthesis process is started. In this case, for example, the mode management unit 170 illustrated in FIG. 13 performs a modification so that the interruption reception unit 171 receives the Vsync notification from the synthesis processing unit 130 as an interruption signal. This may be realized by causing the control unit 173 to switch the operation mode in accordance with the reception of the Vsync notification.

FIGS. 11, 13, and 17 illustrate the operational example in which, first, the image creating process termination notification unit 125 transmits an image creation termination notification to the completion determination unit 140, and then image creation postprocessing is performed, but other operational examples may be considered. For example, the image creating process termination notification unit 125 may transmit the image creating process termination notification after the image creation postprocessing is terminated. In this case, the data processing in the graphic data processing unit 200 has been already terminated inclusive of image creation postprocessing at a point in time when the mode management unit 170 receives a completion notification from the completion determination unit 140. Therefore, the control unit 173 performs control so as to switch the operation mode to the pause mode without waiting for a notification of processing termination from the graphic data processing unit 200.

Figure 19:
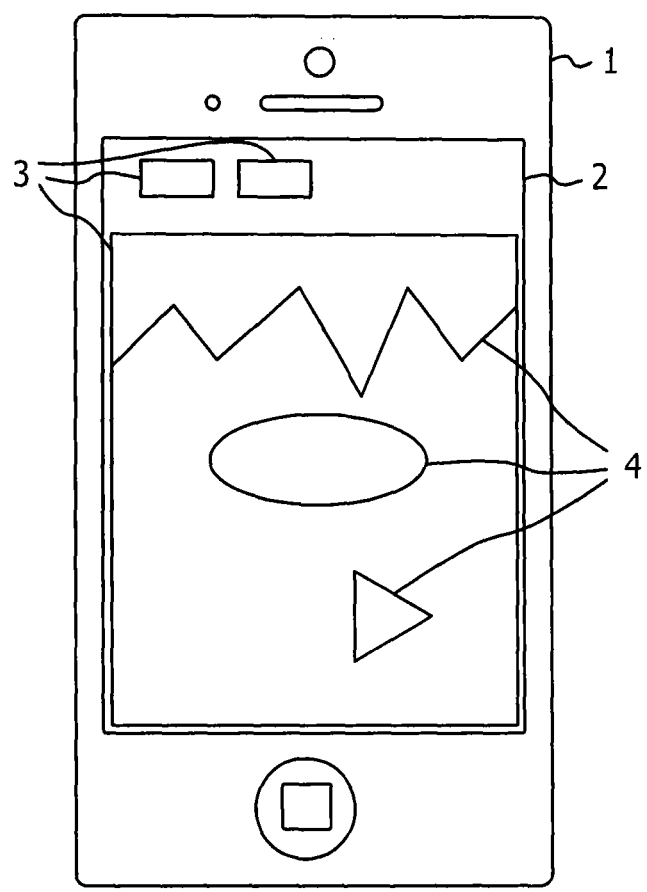
FIG. 19 is a diagram illustrating a definition of another term according to the first embodiment.

Next, the definitions of terms in the first embodiment will be described. FIG. 19 is a diagram illustrating a definition of another term in a case where one application creates a plurality of images. The same terms as those in FIG. 1 will be denoted by the same reference numerals, and a description thereof will be omitted here. In FIG. 1, a description will be given on the assumption that each application performs one image creating process. However, one application may perform a plurality of images creating processes. For example, as in a game application, an application displays image data obtained by synthesizing a background image and a character image which moves independently from the background image on a display as an image of the application. In FIG. 19, an example in which an image (picture 3) drawn by one application includes a plurality of objects 4 is illustrated. In this embodiment, the objects 4 are referred to as "element images". The image creation processing unit 110 creates a plurality of element images. As described in FIG. 9, image creation postprocessing is performed at the end of each image creating process. Accordingly, for example, in the example illustrated in FIG. 19, each of three applications creates an image, and one image thereof includes three element images, and thus five images are created as a whole. In other words, in the first embodiment, the "number" of "images" refers to the number of images including element images. The definition of this term is also applied to a second embodiment and the subsequent embodiments.

Second Embodiment

Figure 20A:
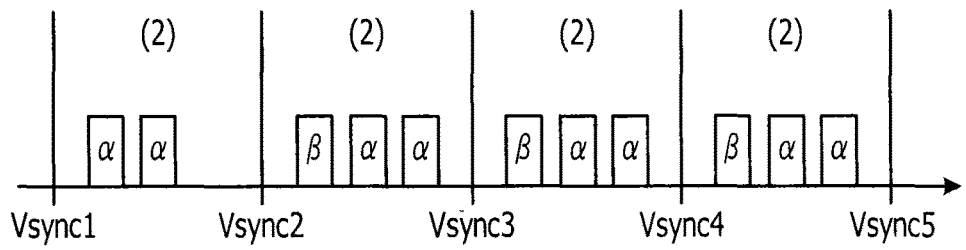
FIGS. 20A to 20C are diagrams illustrating a relationship between a generation timing of each Vsync and execution timings of an image creating process and a synthesis process.
Figure 20B:
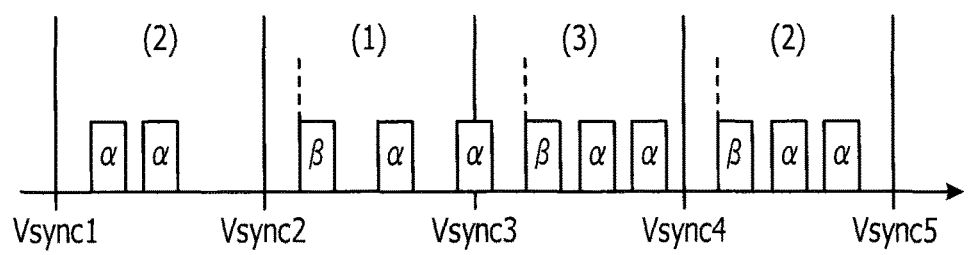
Figure 20C:
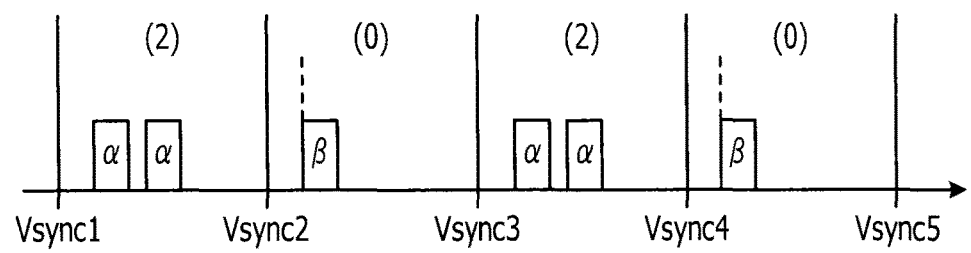

FIGS. 20A, 20B, and 20C are diagrams illustrating a relationship between a generation timing of each Vsync and execution timings of an image creating process and a synthesis process. In FIGS. 20A, 20B, and 20C, a number written within a bracket indicates a number obtained by counting images created for each unit period using the method illustrated in the first embodiment. In FIG. 20A, an image creating process to be performed during each unit period is terminated before the next Vsync is sent. The number within each unit period indicates "2", and the number of images included in each screen is correctly shown. On the other hand, FIG. 20B illustrates a state where a process of creating a second image, among processes of creating two images which are performed in accordance with Vsync2, has not been completed until Vsync3 is sent. In this case, the number of images of which the creation has been completed during a period between Vsync2 and Vsync3 is counted as "1". The number of images created during a unit period between Vsync3 and Vsync4 is counted as "3". In this manner, even when the number of images constituting each screen maintains "2" which is a fixed value, the counted value may be changed to "1" or "3" when a termination timing of the image creating process exceeds Vsync and is delayed. Such a change in the counted value results in discordance between a predicted number and an actual number, which leads to a reduction in an effect of suppressing appropriate power consumption.

FIG. 20C illustrates a relationship between a generation timing of each Vsync and execution timings of an image creating process and a synthesis process when using a processing sequence in which a unit period for performing the image creating process and a unit period for performing the synthesis process alternately occur. In this embodiment, the image creating process is performed based on Vsync1 and Vsync3, and the synthesis process is performed based on Vsync2 and Vsync4. For example, in video screen display regarding YouTube (registered trademark) which is a video-sharing site, the display device 1 performs data processing on data provided from a server, in a processing sequence illustrated in FIG. 20C. In this case, while all images constituting each screen are "2" in the same manner as in FIG. 20A, "2" and "0" which are the counted numbers of images created for each Vsync are alternately repeated. Even in this case, in the counting method in the first embodiment, a predicted number does not coincide with an actual number.

The second embodiment discloses a method for correctly counting the number of images included in each screen even in the case of FIG. 20B or FIG. 20C. In the second embodiment, the counting of the number of images is performed at an interval of a synthesis process, for example, at an interval of a start timing of the synthesis process instead of an interval of Vsync. In other words, the interval of the start timing of the synthesis process is recognized as a "unit period". In this manner, if a termination timing of an image creating process is delayed later than the generation of the next Vsync, it is possible to make the counted number of images coincide with the number of images included in a screen and to appropriately set a predicted number. In order to perform such a process, a signal which is input to the counter 141 of the completion determination unit 140 and the setting unit 172 of the mode management unit 170 from the synthesis processing unit 130 is set as a synthesis process start notification indicating the start of a synthesis process instead of the Vsync notification in FIGS. 7, 12, 13, 16, and 17 disclosed in the first embodiment. The other configurations described in the first embodiment are also applied to the second embodiment.

Figure 21:
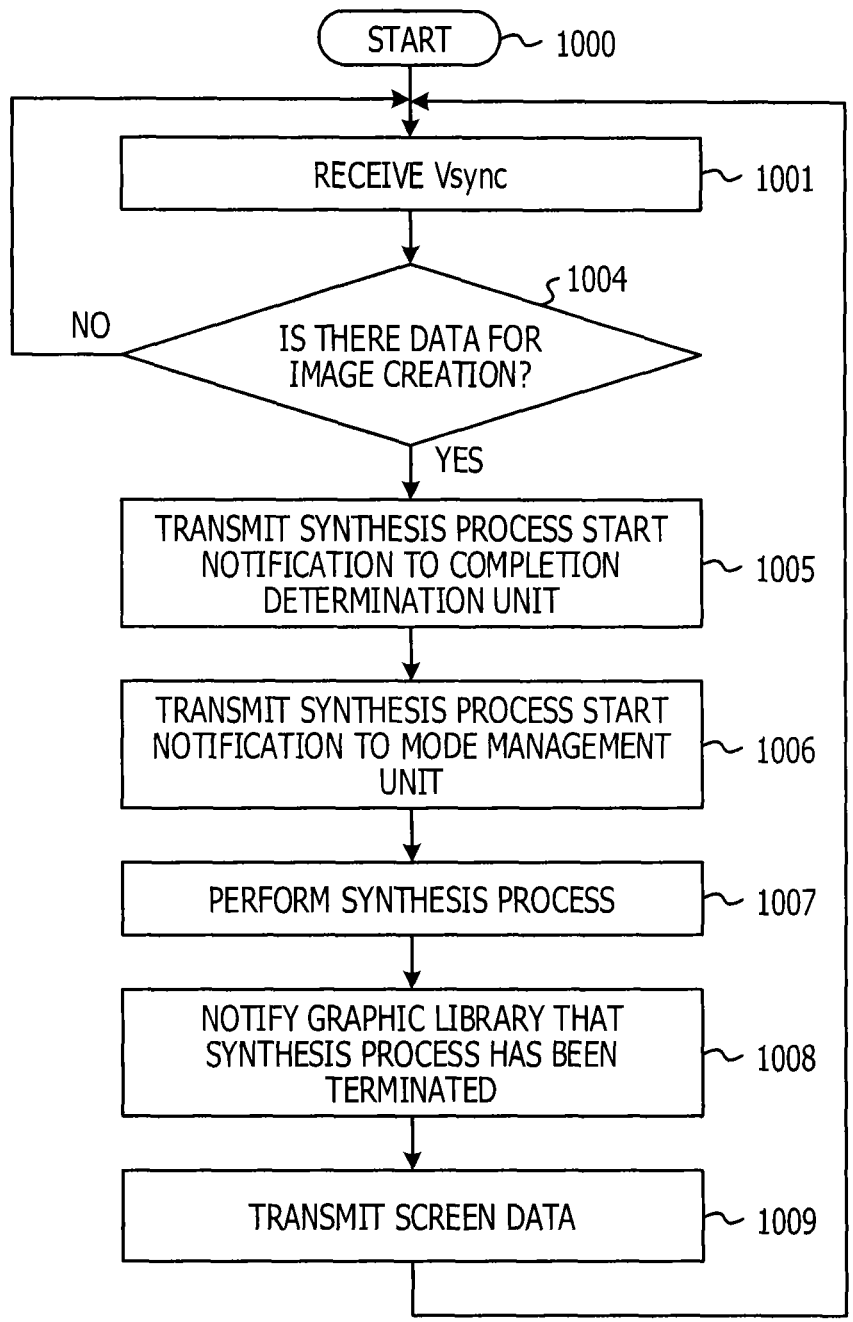
FIG. 21 is a processing flow chart of a synthesis processing unit according to a second embodiment.

FIG. 21 is a processing flow chart of the synthesis processing unit 130 according to the second embodiment. The same processes as those in FIG. 14 are denoted by the same reference numerals, and a description thereof will be appropriately omitted here. After process 1001 is performed, the processing proceeds to process 1004. In process 1004, when it is determined that there is data for screen creation, the processing proceeds to process 1005. In process 1005, the notification unit 132 transmits a synthesis process start notification indicating the start of the synthesis process to the completion determination unit 140. In process 1006, the notification unit 132 transmits the synthesis process start notification to the mode management unit 170. Then, the processing proceeds to process 1007.

In this manner, a synthesis process start notification is used as a trigger for starting to count an image creating process termination notification, instead of the Vsync notification in the first embodiment, and thus it is possible to count the number of images created during a synthesis process and the next synthesis process without counting the number of images at an interval of Vsync. Therefore, it is possible to appropriately count the number of images included in each screen.

Third Embodiment

The first embodiment and the second embodiment describe an example in which the number of images created during a certain unit period is used as the number of images predicted to be created during the next unit period. In a third embodiment, a description will be given of an example in which a predicted number is set based on the statistics of an actual number during a predetermined number of unit periods of the past.

Figure 22:
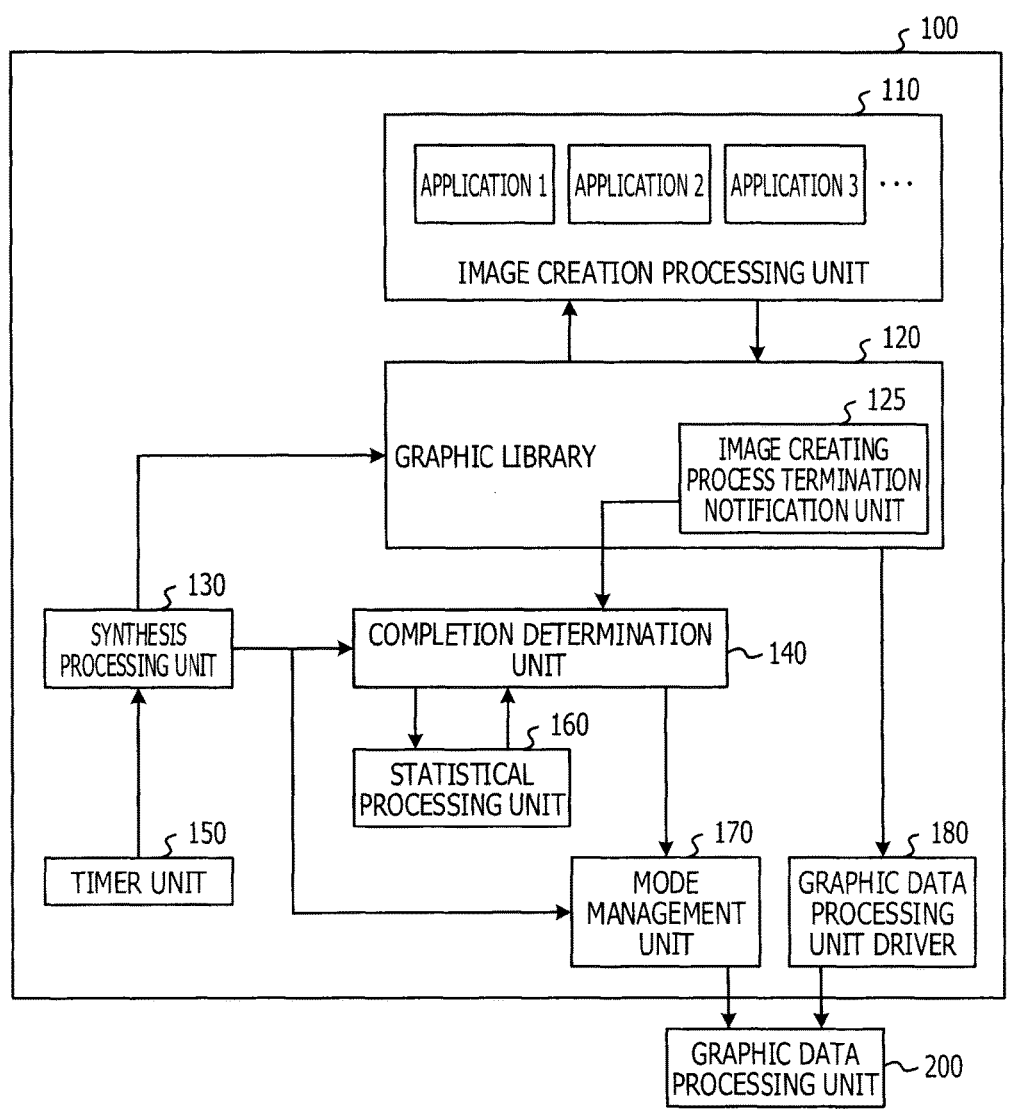
FIG. 22 is a functional block diagram of a CPU according to a third embodiment.

FIG. 22 is a functional block diagram of a CPU 100 according to the third embodiment. The same functional blocks as the functional blocks disclosed in FIG. 7 are denoted by the same reference numerals, and a description thereof will be appropriately omitted here. The CPU 100 functions as a statistical processing unit 160 in addition to functioning as an image creation processing unit 110, a graphic library 120, an image creating process termination notification unit 125, a synthesis processing unit 130, a completion determination unit 140, a timer unit 150, a mode management unit 170, and a graphic data processing unit driver 180. The statistical processing unit 160 is realized by, for example, a middleware layer. The statistical processing unit 160 stores the number of images counted by the completion determination unit 140 by plurality of unit periods. The statistical processing unit 160 performs statistical processing on the stored number of images. The statistical processing unit 160 predicts the number of images created during the next unit period, and notifies the completion determination unit 140 of the predicted number. As a method of performing the statistical processing, a plurality of methods are considered such as, for example, a method of adopting an average value of actual numbers in a plurality of unit periods of the past as a predicted number. However, here, a method of creating distribution of actual numbers in a plurality of unit periods of the past and setting an actual number having a maximum appearance frequency as a predicted number will be described as an example.

Figure 23:
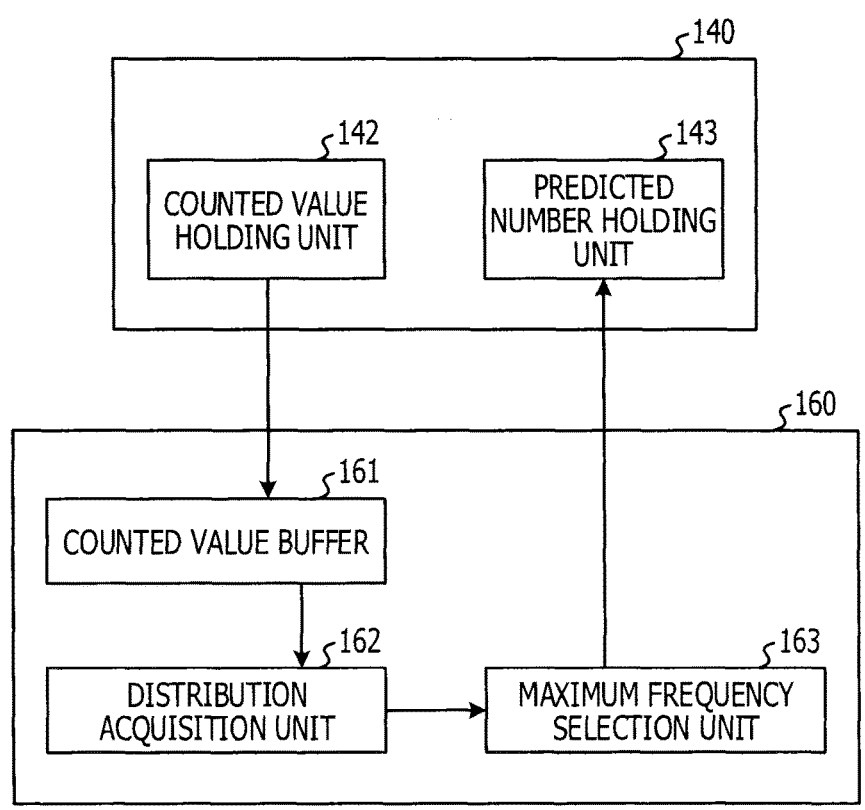
FIG. 23 is a functional block diagram of a statistical processing unit according to the third embodiment.

FIG. 23 is a functional block diagram of the statistical processing unit 160. The statistical processing unit 160 functions as a counted value buffer 161, a distribution acquisition unit 162, and a maximum frequency selection unit 163. The counted value buffer 161 acquires values counted during the respective unit periods from a counted value holding unit 142 of the completion determination unit 140 and sequentially stores the counted values. The counted value buffer 161 is realized by, for example, a first in first out (FIFO) type data buffer. The distribution acquisition unit 162 obtains the distribution of counted values based on the stored values stored in the counted value buffer 161. The maximum frequency selection unit 163 selects a counted value having a maximum counted value based on the distribution obtained by the distribution acquisition unit 162.

Then, the distribution acquisition unit 162 notifies a predicted number holding unit 143 of the completion determination unit 140 of the selected counted value. In this embodiment, the counted value holding unit 142, the counted value buffer 161, the distribution acquisition unit 162, the maximum frequency selection unit 163, and the predicted number holding unit 143 are equivalent to prediction units.

Figure 24:
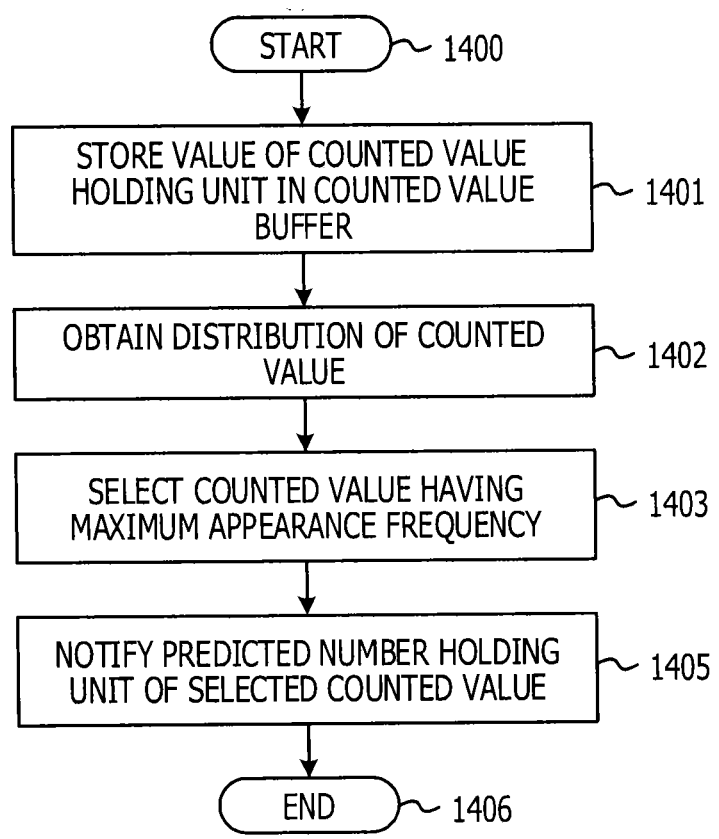
FIG. 24 is a processing flow chart of the statistical processing unit according to the third embodiment.

FIG. 24 is a processing flow chart of the statistical processing unit 160. The processing of the statistical processing unit 160 is started by process 1400. In process 1401, the counted value buffer 161 stores a counted value of the counted value holding unit 142. A plurality of counted values of the past are sequentially stored in the counted value buffer 161. In process 1402, the distribution acquisition unit 162 obtains the distribution of counted values. In process 1403, the maximum frequency selection unit 163 selects a counted value having a maximum appearance frequency based on the distribution of counted values which is obtained by the distribution acquisition unit 162. In process 1405, the maximum frequency selection unit 163 notifies the predicted number holding unit 143 of the selected counted value, and the processing is terminated in process 1406.

Figure 25:
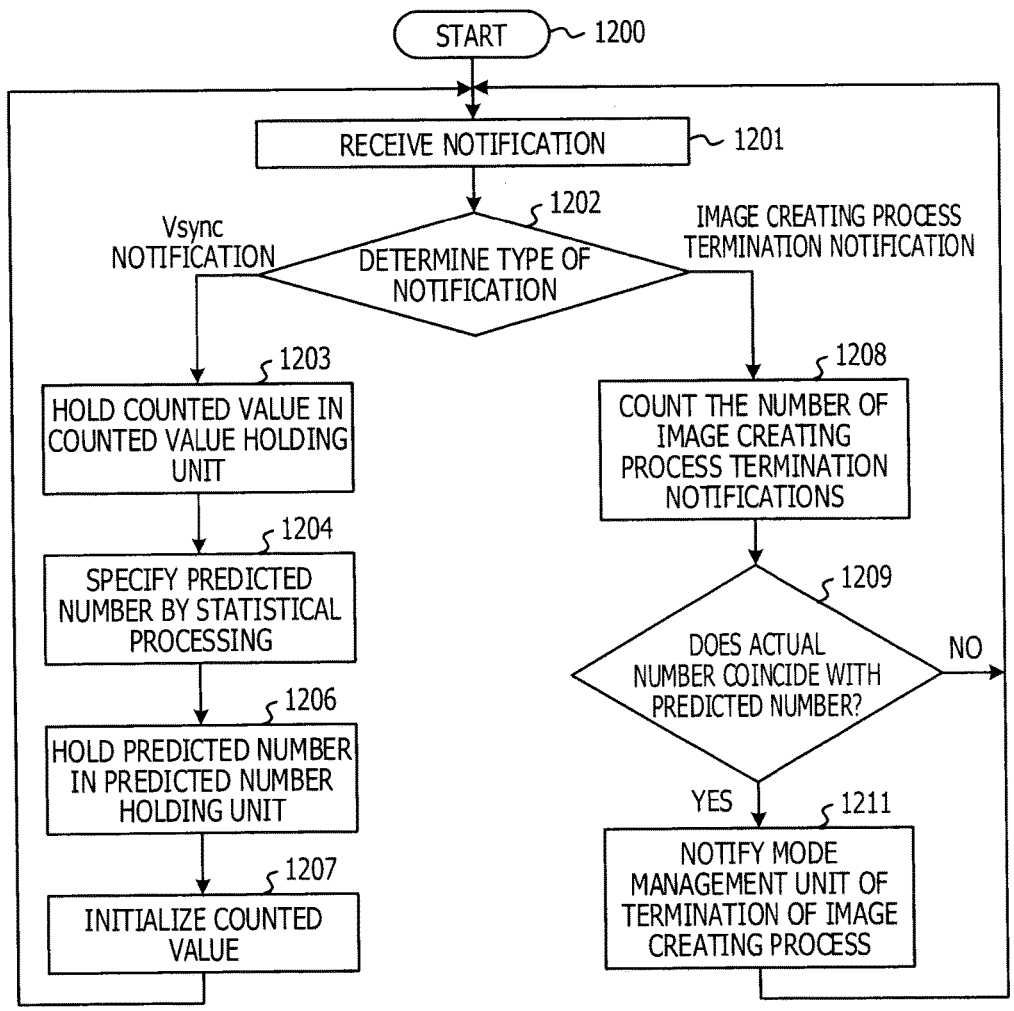
FIG. 25 is a processing flow chart of a completion determination unit and the statistical processing unit according to the third embodiment.

FIG. 25 is a processing flow chart of the completion determination unit 140 and the statistical processing unit 160 according to the third embodiment. The same processes as those in FIG. 16 are denoted by the same reference numerals, and a description thereof will be appropriately omitted here. In process 1203, the counted value holding unit 142 holds a counted value of a counter 141. Thereafter, in process 1204, the statistical processing unit 160 performs statistical processing to thereby specify a predicted number. In process 1206, the predicted number holding unit 143 holds the predicted number specified by the statistical processing unit 160. In process 1207, the counter 141 initializes the counted value, and the processing returns to process 1201.

Figure 26:
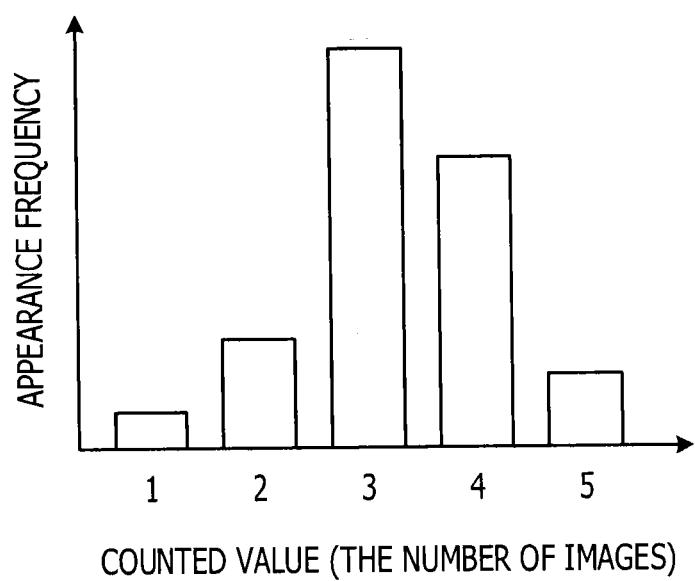
FIG. 26 is a diagram illustrating an example of the distribution of an appearance frequency with respect to a counted value according to the third embodiment.

FIG. 26 is a diagram illustrating an example of the distribution of an appearance frequency with respect to a counted value, which is obtained by the distribution acquisition unit 162. In the example of FIG. 26, the appearance frequency is largest in the counted value of "3". This case indicates that the number of unit periods having the number of created images of "3" is largest in a plurality of unit periods of the past. Therefore, it is determined that there is a high possibility of the number of images to be created during the next unit period being set to "3", and thus "3" is selected as a predicted number.

Figure 27:
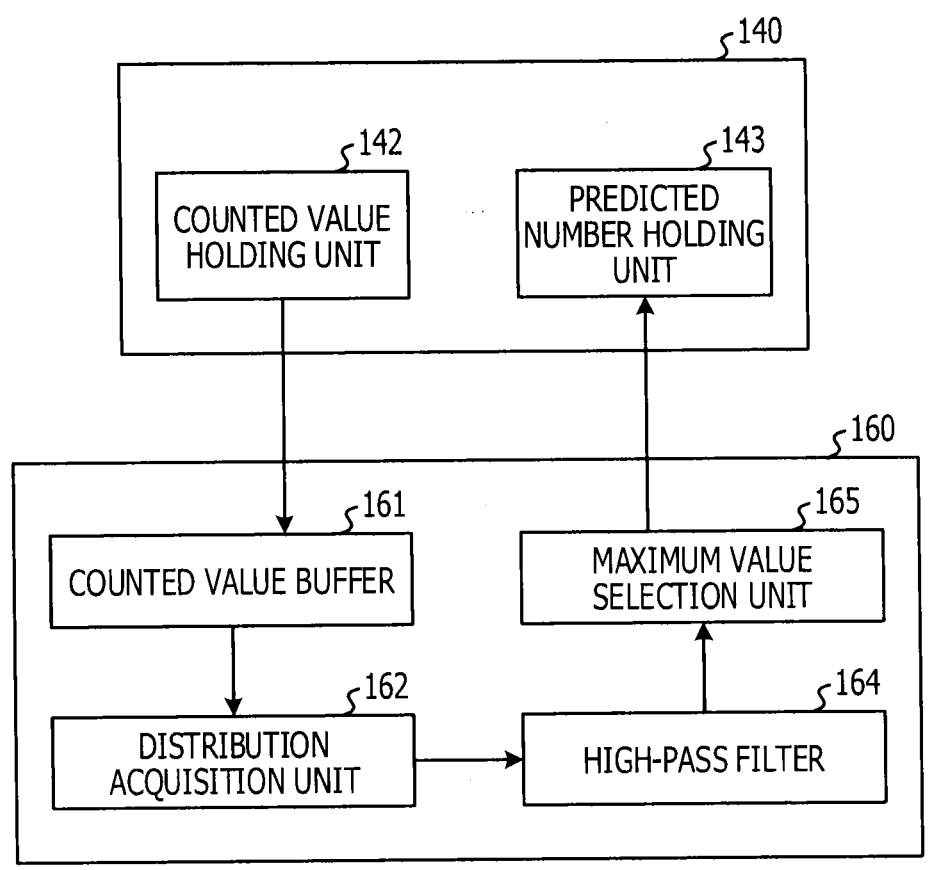
FIG. 27 is a functional block diagram of a statistical processing unit according to a modified example of the third embodiment.

FIG. 27 is a functional block diagram of the statistical processing unit 160 according to a modified example of the third embodiment. In the third embodiment, a counted value having the maximum appearance frequency is selected as a predicted number. On the other hand, in this modified example, a threshold value of an appearance frequency is provided, and when there are a plurality of counted values in which an appearance frequency exceeds the threshold value, the maximum value among the plurality of counted values is specified as a predicted number. In FIG. 27, the same functional blocks as the functional blocks described in FIG. 23 are denoted by the same reference numerals, and a description thereof will be omitted there. The statistical processing unit 160 functions as a high-pass filter 164 and a maximum value selection unit 165 in addition to functioning as the counted value buffer 161 and the distribution acquisition unit 162. The high-pass filter 164 filters only counted values having an appearance frequency being equal to or greater than a fixed threshold value with respect to the distribution obtained by the distribution acquisition unit 162, and performs notification to the maximum value selection unit 165. The maximum value selection unit 165 selects the maximum counted value among the counted values having passed through the high-pass filter 164. Then, the maximum value selection unit 165 notifies the predicted number holding unit 143 of the selected counted value as a predicted number. In this modified example, the counted value holding unit 142, the counted value buffer 161, the distribution acquisition unit 162, the high-pass filter 164, the maximum value selection unit 165, and the predicted number holding unit 143 are equivalent to prediction units.

Figure 28:
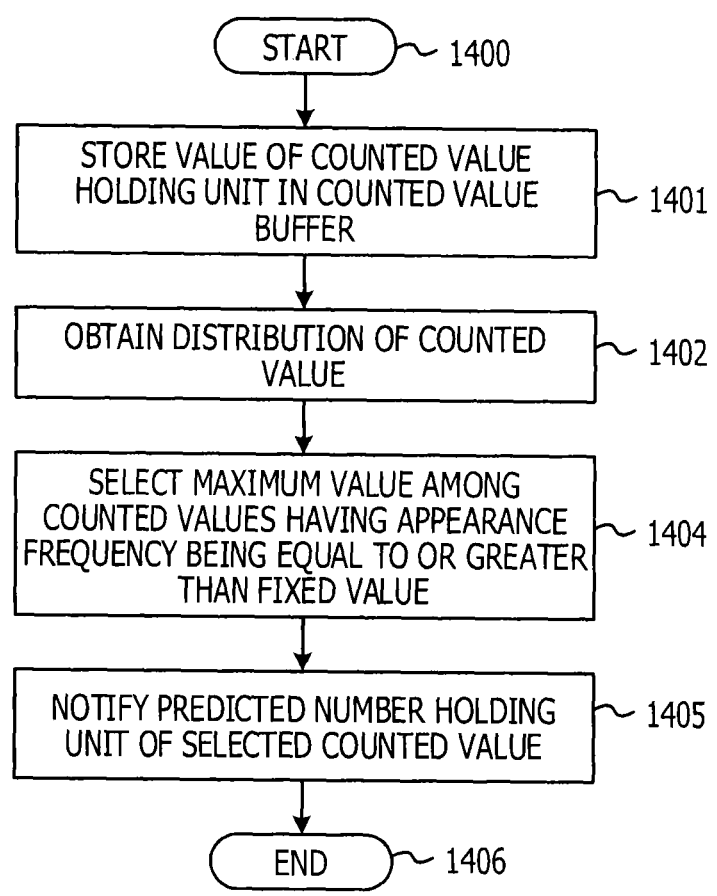
FIG. 28 is a processing flow chart of a statistical processing unit according to a modified example of the third embodiment.

FIG. 28 is a processing flow chart of the statistical processing unit 160 according to a modified example of the third embodiment. The same processes as those in FIG. 24 are denoted by the same reference numerals, and a description thereof will be appropriately omitted here. After process 1402 is performed, the maximum value selection unit 165 selects the maximum value among the counted values, having an appearance frequency being equal to or greater than a fixed threshold value, filtered by the high-pass filter 164, in process 1404. Then, in process 1405, the maximum value selection unit 165 notifies the predicted number holding unit 143 of the selected value.

Figure 29:
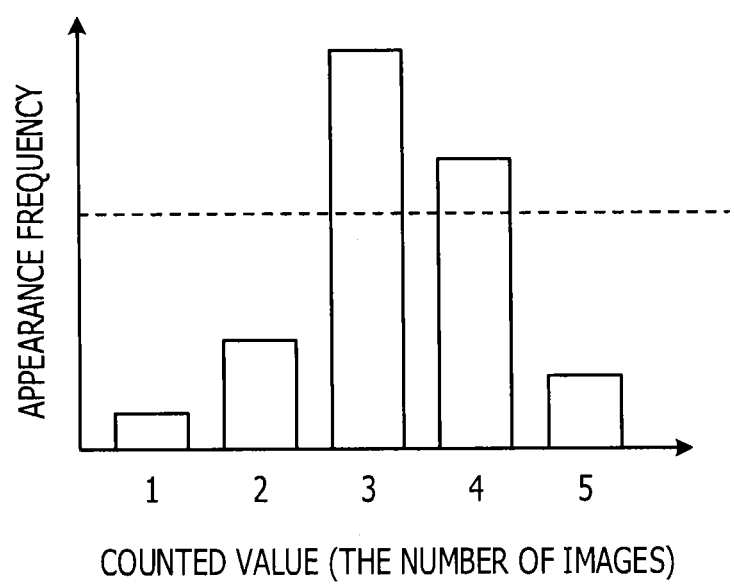
FIG. 29 is a diagram illustrating an example of the distribution of an appearance frequency with respect to a counted value according to a modified example of the third embodiment.

FIG. 29 is a diagram illustrating an example of the distribution of an appearance frequency with respect to a counted value, which is obtained by the distribution acquisition unit 162. A dotted line indicates a threshold value of the appearance frequency. In counted values "3" and "4", the appearance frequency exceeds the threshold value. In this case, the maximum value in the counted values "3" and "4", that is, the counted value "4" is selected as a predicted number. In this manner, the predicted number is selected, and thus it is possible to suppress the number of times of setting an operation mode to a pause mode even though an image creating process has not yet been completed.

Fourth Embodiment

In the first to third embodiments, a description has been given of a method of predicting the number of images created during the next unit period based on the number of images for each unit period of the past and changing an operation mode. In these embodiments, it may be possible to appropriately change an operation mode due to the right predicted number of images, but the predicted number may not be right. An operation in a case where the predicted number is not right will be described by taking an example of the first embodiment.

When a predicted number which is larger than the number of images actually created is set, it is not possible to change an operation mode to a pause mode, for example, as illustrated in the period C and the period D of FIG. 18. On the contrary, when a predicted number which is smaller than the number of images actually created is set, a graphic data processing unit 200 transitions to a pause mode in spite of a state where images to be created still remain. Even in this case, the graphic data processing unit 200 transitions to an active mode and performs a process of creating image data when data to be processed is given from a graphic data processing unit driver 180. However, an operation mode set in the setting unit 172 is changed to a "pause mode" based on a completion notification from a completion determination unit 140. For this reason, the graphic data processing unit 200 transitions to a pause mode again at a point in time when the processing of the data given from the graphic data processing unit driver 180 is terminated. In this manner, when a completion notification is once issued from the completion determination unit 140, transition between the pause mode and the active mode is repeated when data processing for creating an image is continued thereafter. As illustrated in FIG. 3, transition from a pause mode to an active mode takes a long time as compared with transition from a standby mode to an active mode. Therefore, transition from a pause mode to an active mode is repeated, and thus it may not be possible to terminate a predetermined image creating process within a unit period or to further delay the subsequent processing.

Accordingly, a fourth embodiment discloses a method capable of suppressing a delay in an image creating process even when a greater number of images than the predicted number of images are created.

Figure 30:
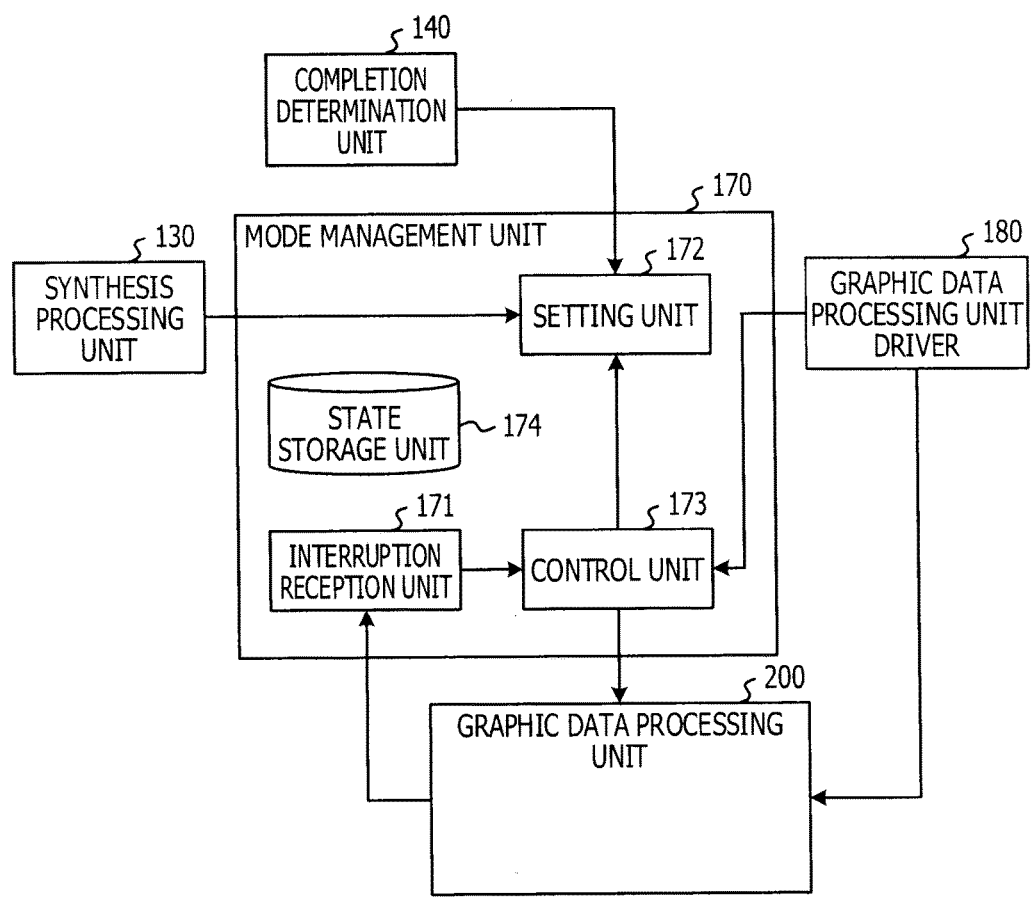
FIG. 30 is a functional block diagram of a mode management unit according to a fourth embodiment.
Figure 31:
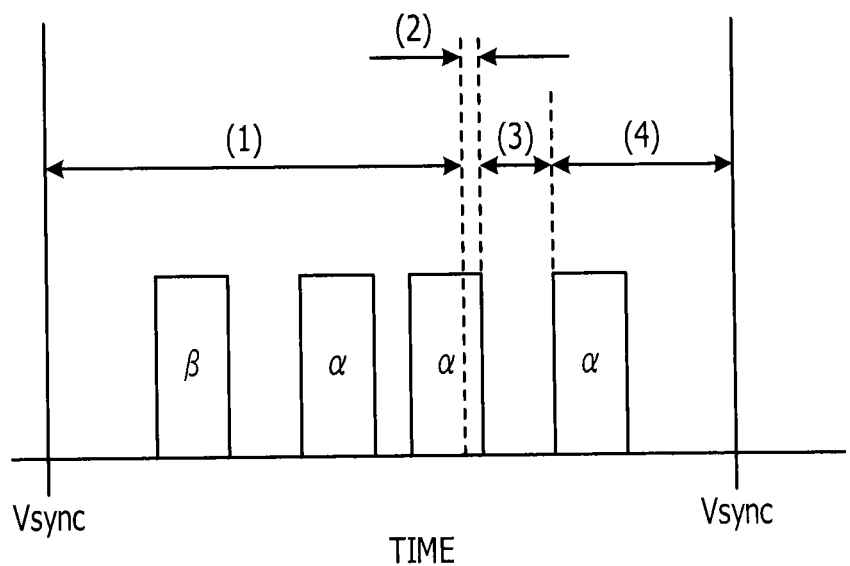
FIG. 31 is a diagram illustrating four states included in a unit period.

FIG. 30 is a functional block diagram of a mode management unit 170 according to the fourth embodiment. The same functional blocks as those in FIG. 13 are denoted by the same reference numerals, and a description thereof will be appropriately omitted here. The mode management unit 170 functions a state storage unit 174 in addition to functioning as an interruption reception unit 171, a setting unit 172, and a control unit 173. FIG. 31 is a diagram illustrating four states included in a unit period. In FIG. 31, after Vsync is sent, a state until a completion notification is issued from the completion determination unit 140 will be referred to as a first state. In FIG. 31, a period written as (1) is equivalent to the first state. Next, a state until the control unit 173 changes the operation mode of the graphic data processing unit 200 to a pause mode in response to the termination notification from the graphic data processing unit 200 after the completion notification is issued from the completion determination unit 140 will be referred to as a second state. In FIG. 31, a period written as (2) is equivalent to the second state. Next, a state until an image creating process is resumed based on a start notification of data processing from the graphic data processing unit driver 180 after the operation mode of the graphic data processing unit 200 is changed to the pause mode will be referred to as a third state. In FIG. 31, a period written as (3) is equivalent to the third state. Finally, a state until the next Vsync is sent after the image creating process is resumed will be referred to as a fourth state. In FIG. 31, a period written as (4) is equivalent to the fourth state. The state storage unit 174 illustrated in FIG. 30 is a block that stores which state of the above-mentioned four states the present state is. The fourth embodiment discloses a method for controlling the graphic data processing unit 200 in a standby mode without shifting the graphic data processing unit to a pause mode even when the data processing of the graphic data processing unit 200 is terminated in the fourth state.

FIG. 32 is a diagram illustrating a relationship between a value stored in the state storage unit 174, a state corresponding to the value stored in the state storage unit 174, and a condition for recognizing each state. When the mode management unit 170 receives a Vsync notification from the synthesis processing unit 130, a state may be recognized to be a first state. For this reason, the state storage unit 174 stores a value "1" that means the first state. When the mode management unit 170 receives a completion notification from the completion determination unit 140, a state may be recognized to be a second state. For this reason, the state storage unit 174 stores a value "2" that means the second state. When the mode management unit 170 receives a termination notification from the graphic data processing unit 200 and the state at that time is the second state, a state may be recognized to be a third state. For this reason, the state storage unit 174 stores a value "3" that means the third state. When the mode management unit 170 receives a start notification from the graphic data processing unit driver 180 and the state at that time is the third state, a state may be recognized to be a fourth state. For this reason, the state storage unit 174 stores a value "4" that means the fourth state.

Figure 34:
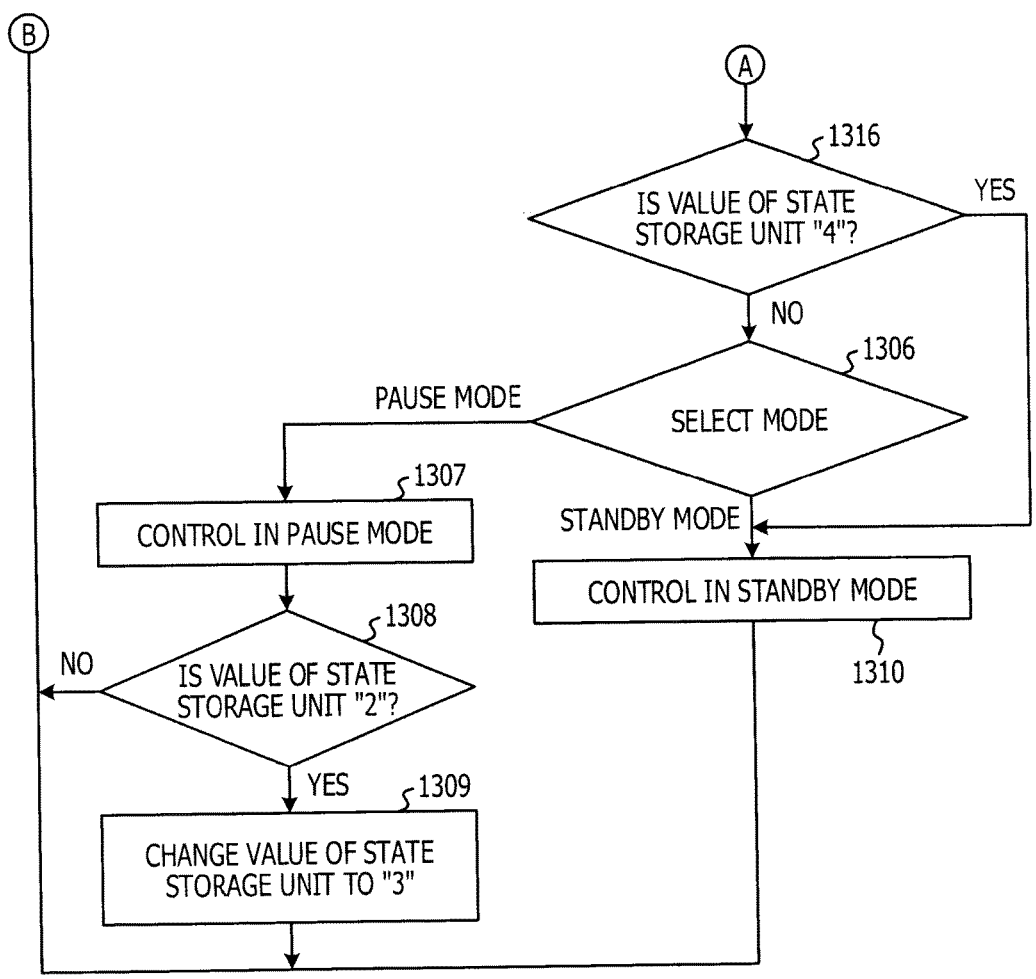
FIG. 34 is a processing flow chart of the mode management unit according to the fourth embodiment.

FIGS. 33 and 34 are processing flow charts of the mode management unit 170 according to the fourth embodiment. The same processes as those in FIG. 17 are denoted by the same reference numerals, and a description thereof will be appropriately omitted here. FIGS. 33 and 34 are a series of processing flow charts. "A" of FIG. 33 is connected to "A" of FIG. 34, and "B" of FIG. 34 is connected to "B" of FIG. 33.

In process 1314, the operation mode set in the setting unit 172 is written back from a "pause mode" to a "standby mode" based on a Vsync notification received from the synthesis processing unit 130. Thereafter, in process 1315, the state storage unit 174 changes the value stored therein to "1", and the processing returns to process 1301. Thereafter, when a completion notification is issued from the completion determination unit 140, the setting of the setting unit 172 is changed from the "standby mode" to the "pause mode" in process 1303. Thereafter, the state storage unit 174 changes the value stored therein to "2" in process 1304. Further, in process 1307, the operation mode of the graphic data processing unit 200 is changed to a pause mode based on a termination notification from the graphic data processing unit 200. Thereafter, in process 1308, the state storage unit 174 determines whether or not the value stored therein is "2". When the value stored in the state storage unit 174 is "2", the state storage unit 174 changes the value stored therein to "3" in process 1309. In process 1308, when the value stored in the state storage unit 174 is a value other than "2", the processing returns to process 1301. Further, in process 1311, the operation mode of the graphic data processing unit 200 is changed to an active mode. Thereafter, in process 1312, the state storage unit 174 determines whether or not the value stored therein is "3". When the value stored in the state storage unit 174 is "3", the state storage unit 174 changes the value stored therein to "4" in process 1313. In process 1312, when the stored value is a value other than "3", the processing returns to process 1301.

When it is determined in process 1305 that the mode management unit 170 has received a termination notification of data processing from the graphic data processing unit 200, the control unit 173 determines in process 1316 whether or not the value stored in the state storage unit 174 is "4". When the value stored in the state storage unit 174 is not "4", the processing proceeds to process 1306, and an operation mode is selected based on the setting contents of the setting unit 172. On the other hand, when the value stored in the state storage unit 174 is "4", the processing proceeds to process 1310. In process 1310, the control unit 173 controls the graphic data processing unit 200 in a standby mode regardless of the setting contents of the setting unit 172. That is, when data processing for creating an image is further performed after the completion notification is issued from the completion determination unit 140, the control unit 173 does not perform transition to a pause mode even when receiving a termination notification from the graphic data processing unit 200.

By such control, it is possible to inhibit transition to a pause mode from being repeatedly performed and to suppress a delay in the termination of an image creating process even when a predicted number which is smaller than the number of images actually created is set.

Next, a modified example of the fourth embodiment will be described. Similarly to the fourth embodiment, even in this modified example, when data processing for creating an image is further performed after a completion notification is issued from the completion determination unit 140, the control unit 173 does not shifts the graphic data processing unit 200 to a pause mode even when receiving a termination notification from the graphic data processing unit 200.

Figure 35:
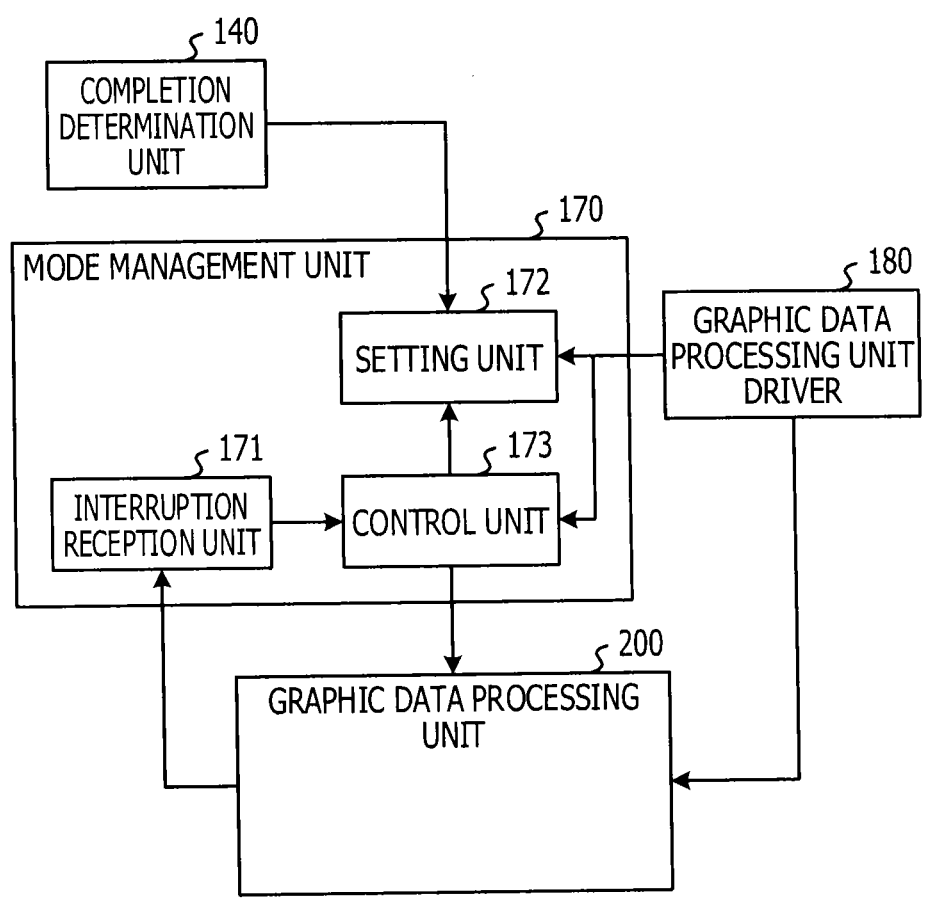
FIG. 35 is a functional block diagram of a mode management unit according to a modified example of the fourth embodiment.

FIG. 35 is a functional block diagram of the mode management unit 170 according to a modified example of the fourth embodiment. The same functional blocks as those in FIG. 13 are denoted by the same reference numerals, and a description thereof will be omitted here. The setting unit 172 and the control unit 173 of the mode management unit 170 according to this modified example receive a start notification from the graphic data processing unit driver 180. The control unit 173 shifts the operation mode of the graphic data processing unit 200 from a pause mode to an active mode based on this start notification. Thereby, data processing in the graphic data processing unit 200 is resumed. Further, the setting in the setting unit 172 is changed from a "pause mode" to a "standby mode" based on this start notification. Thereby, when a termination notification of processing is subsequently given from the graphic data processing unit 200, the operation mode of the graphic data processing unit 200 is switched to a standby mode instead of a pause mode.

Figure 36:
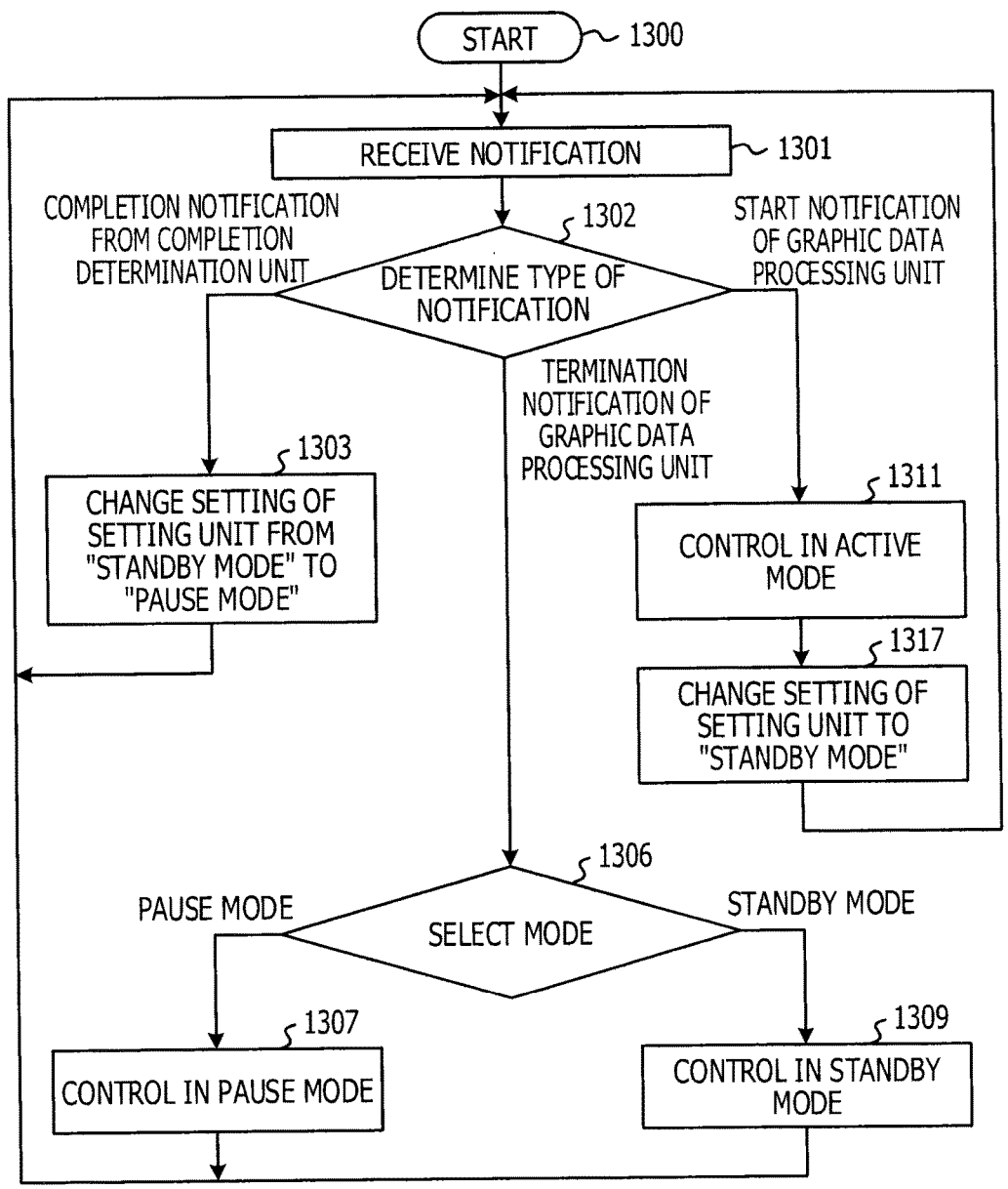
FIG. 36 is a processing flow chart of a mode management unit according to a modified example of the fourth embodiment.

FIG. 36 is a processing flow chart of the mode management unit 170 according to a modified example of the fourth embodiment. The same processes as those in FIGS. 17 and 33 are denoted by the same reference numerals, and a description thereof will be appropriately omitted here. In process 1311, the control unit 173 shifts the operation mode of the graphic data processing unit 200 to an active mode. Thereafter, in process 1317, the setting unit 172 changes the set operation mode to a "standby mode". Thereby, when data processing for creating an image is further performed after the completion notification of the completion determination unit 140 is issued, it is possible to perform control so as not to shift the operation mode of the graphic data processing unit 200 to a pause mode.

Fifth Embodiment

In the first to fourth embodiments, a method of predicting the number of images based on the number of created images of the past has been described. In this case, when the number of images created for each unit period does not vary, the probability of a predicted number and an actual number coinciding with each other (hereinafter, a hit rate) becomes higher. However, when the number of images created for each unit period varies, a hit rate is reduced. When control for suppressing power consumption is performed even in a state of a low hit rate, it is not possible to expect an effect of reducing power consumption, and the risk of causing a delay in an image creating process is also increased. Accordingly, in a fifth embodiment, a description will be given of a method of calculating a hit rate of a predicted number and temporarily pausing control for reducing power consumption when the hit rate does not reach a predetermined value.

Figure 37A:
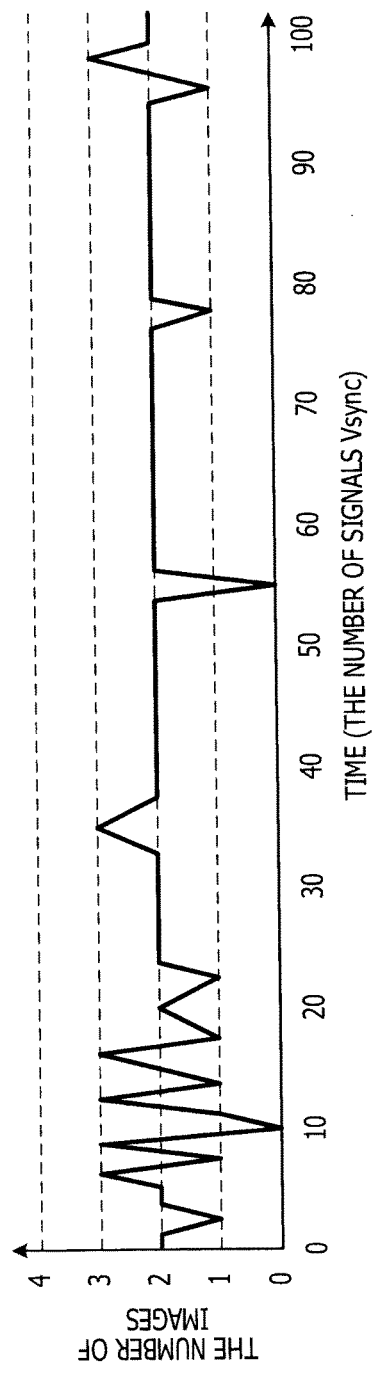
FIGS. 37A and 37B are diagrams illustrating examples of actions of the number of images created for each unit period and a hit rate, respectively.
Figure 37B:
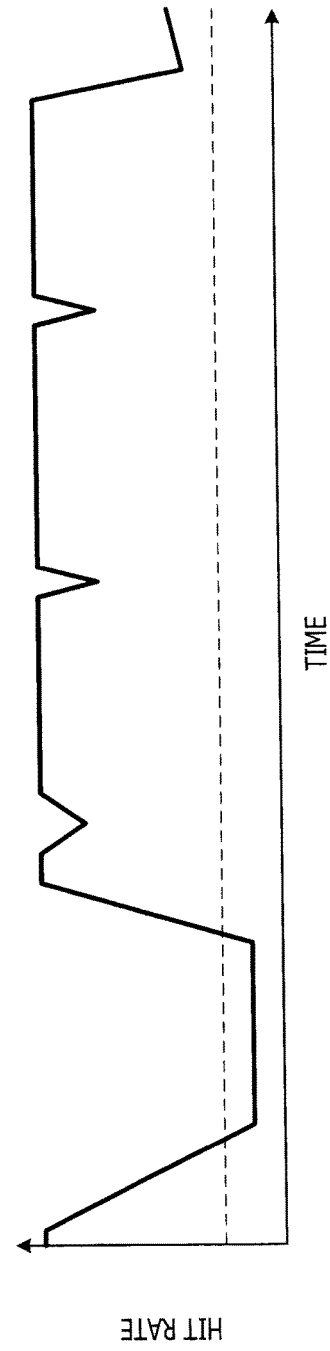

FIGS. 37A and 37B are diagrams illustrating examples of actions of the number of images created for each unit period and a hit rate, respectively. In FIG. 37A, a horizontal axis represents time (the number of signals Vsync), and a vertical axis represents the number of images created for each unit period. In FIG. 37B, a horizontal axis represents time, and a vertical axis represents a hit rate. The hit rate of a predicted number is reduced during a period for which the number of images varies for each Vsync. In this embodiment, when the hit rate is lower than a predetermined value, a method of reducing power consumption, that is, control of shifting the operation mode of the graphic data processing unit 200 to a pause mode based on the number of created images reaching the predicted number is not performed.

Figure 38:
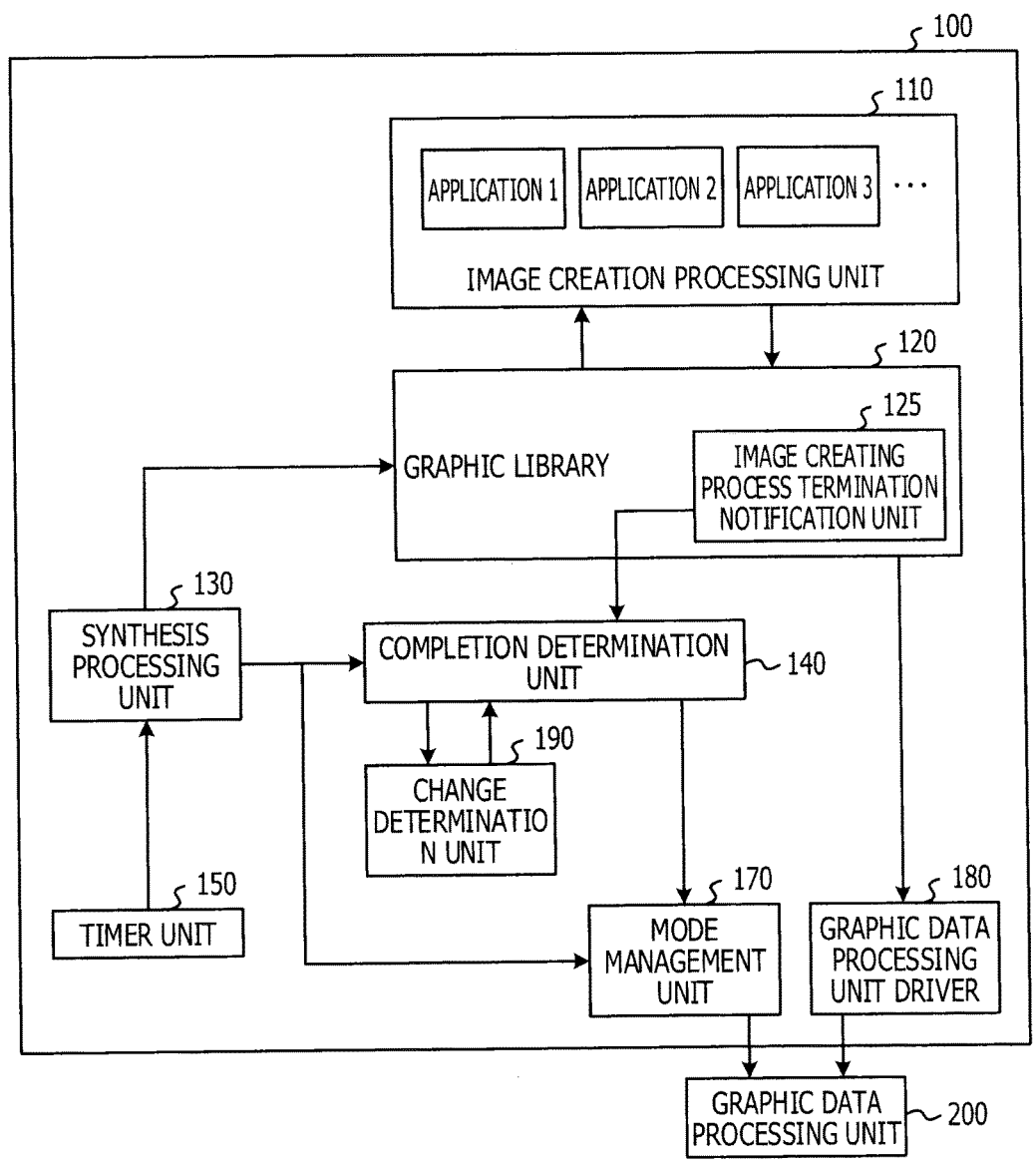
FIG. 38 is a functional block diagram of a CPU according to a fifth embodiment.

FIG. 38 is a functional block diagram of a CPU 100 according to the fifth embodiment. The same functional blocks as the functional blocks disclosed in FIG. 7 are denoted by the same reference numerals, and a description thereof will be appropriately omitted here. The CPU 100 functions as a change determination unit 190 in addition to functioning as an image creation processing unit 110, a graphic library 120, an image creating process termination notification unit 125, a synthesis processing unit 130, a completion determination unit 140, a timer unit 150, a mode management unit 170, and a graphic data processing unit driver 180. The change determination unit 190 is realized by, for example, a middleware layer. The change determination unit 190 determines whether or not the number of images created for each unit period varies, based on the hit rate of the predicted number, and performs notification to the completion determination unit 140.

Figure 39:
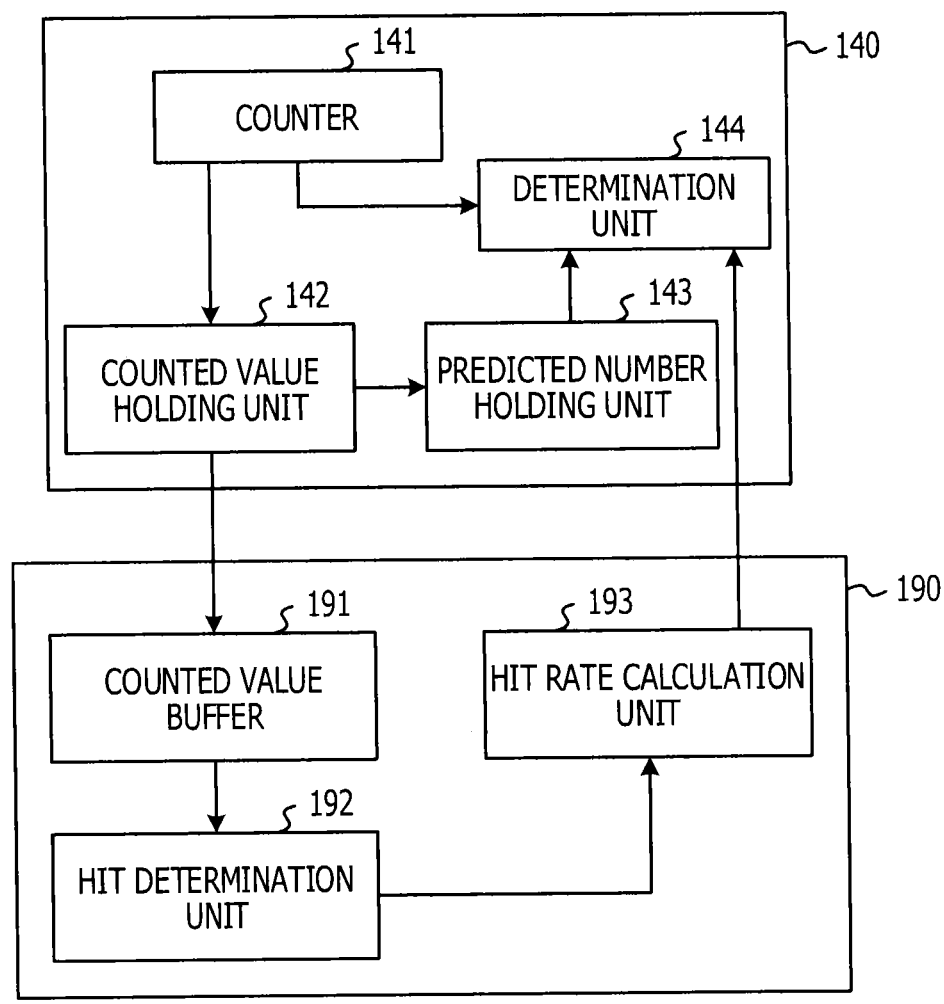
FIG. 39 is a functional block diagram of a change determination unit according to the fifth embodiment.

FIG. 39 is a functional block diagram of the change determination unit 190. The change determination unit 190 functions as a counted value buffer 191, a hit determination unit 192, and a hit rate calculation unit 193. The counted value buffer 191 sequentially acquires and stores a counted value held in a counted value holding unit 142 of the completion determination unit 140. The counted value buffer 191 is realized by, for example, a FIFO type data buffer. The hit determination unit 192 determines whether or not a predicted number is right, based on the counted value stored in the counted value buffer 191. For example, when two pieces of data that are continuously stored in a FIFO type data buffer coincide with each other, it is determined that the prediction is right. The hit rate calculation unit 193 calculates a hit rate based on a determination result of a hit over a predetermined period of time which is performed by the hit determination unit 192. When the hit rate does not reach a predetermined value, the hit rate calculation unit 193 performs notification to a determination unit 144 of the completion determination unit 140.

Figure 40:
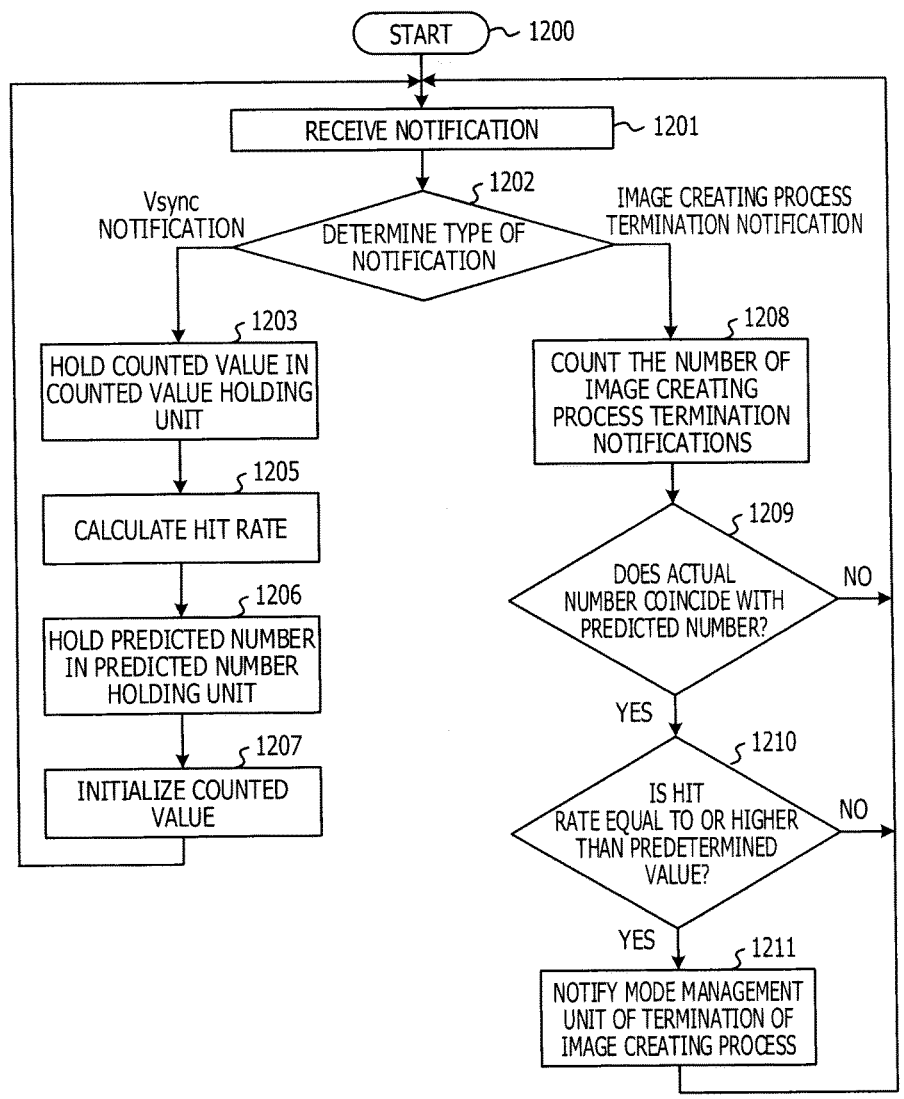
FIG. 40 is a processing flow chart of a completion determination unit and a change determination unit according to the fifth embodiment.

FIG. 40 is a processing flow chart of the completion determination unit 140 and the change determination unit 190. The same processes as those in FIG. 16 are denoted by the same reference numerals, and a description thereof will be appropriately omitted here. In process 1203, the counted value holding unit 142 holds a counted value of the counter 141. Thereafter, in process 1205, the hit rate calculation unit 193 performs a process of calculating a hit rate. Then, in process 1209, the determination unit 144 of the completion determination unit 140 determines that an actual number and a predicted number coincide with each other, the determination unit 144 determines in process 1210 whether or not the hit rate is equal to or higher than a predetermined value. When the hit rate is equal to or higher than the predetermined value, the determination unit 144 transmits a completion notification to the mode management unit 170 in process 1211. In process 1210, when it is determined that the hit rate does not reach the predetermined value, the processing returns to process 1201 without performing notification to the mode management unit 170 by the determination unit 144.

Figure 41:
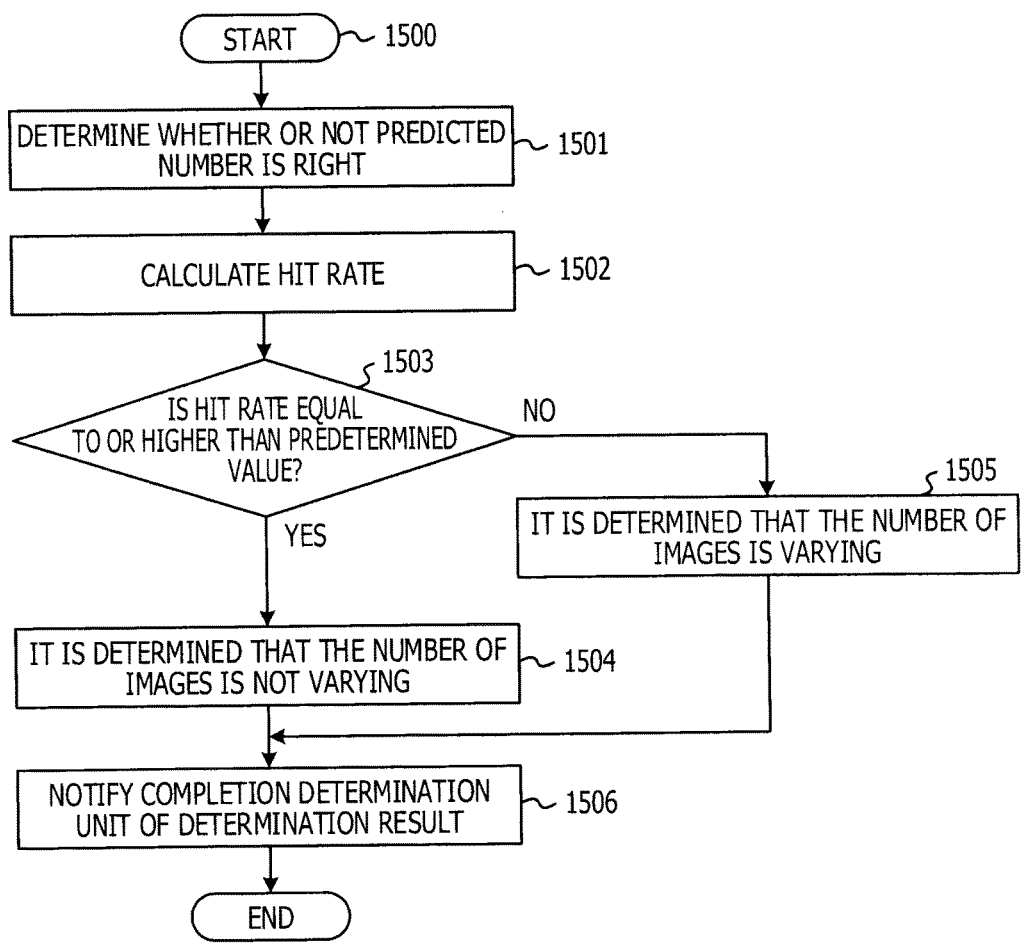
FIG. 41 is a processing flow chart of the change determination unit according to the fifth embodiment.

FIG. 41 is a processing flow chart of the change determination unit 190. The processing of the determination unit 190 is started by process 1500. In process 1501, a hit determination unit 192 determines whether or not a predicted number is right. In process 1502, the hit rate calculation unit 193 calculates a hit rate based on a determination result of the hit determination unit 192. In process 1503, the hit rate calculation unit 193 determines whether or not the hit rate is equal to or higher than a predetermined value. When the hit rate is equal to or higher than the predetermined value, the processing proceeds to process 1504. When the hit rate is lower than the predetermined value, the processing proceeds to process 1505. In process 1504, the hit rate calculation unit 193 determines that the number of images for each unit period is not varying. In process 1505, the hit rate calculation unit 193 determines that the number of images for each unit period is varying. In process 1506, the hit rate calculation unit 193 notifies the completion determination unit 140 of a determination result.

By such control, when the number of images created for each unit period varies and the hit rate is lower than the predetermined value, it is possible to temporarily stop control of suppressing power consumption by the mode management unit 170. When the variation in the number of images settles and the hit rate is restored to the predetermined value, it is possible to perform control so as to resume the control of suppressing power consumption by the mode management unit 170.

The first to fifth embodiments have been described so far. In these embodiments, a description has been given on the assumption that an application performs image creation, but the software for performing image creation is not limited to the application. For example, the technique of this disclosure may be applied even in a case where an operating system (OS) performs image creation.

In the first to fifth embodiments, a termination timing of an image creating process is predicted by predicting the number of images based on results of an image creating process during a unit period of the past. However, a method of predicting a termination timing of an image creating process based on results of the past is not limited to a method based on the number of images. For example, time desired for data processing related to image creation during each unit period of the past may be recorded, a termination time of an image creating process may be predicted based on the recorded time, and it may be determined that image processing has been terminated at the predicted time to thereby change an operation mode of the graphic data processing unit 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data processing method performed by a first processor configured to control a second processor that performs a process of creating a screen in synchronization with synchronization signals generated at predetermined time intervals, the data processing method comprising:
    measuring a number of first images created by the second processor during a first period corresponding to one of the predetermined time intervals;
    predicting a termination timing of a creating process of second images executed by the second processor during a second period following the first period, the second images being images time-serially created after the first images, based on the number of first images created by the second processor during the first period;
    counting a number of the second images time-serially created by the second processor during the second period after the second period is started;
    determining whether the predicted termination timing has elapsed based on the counted number of second images; and
    switching an operation mode of the second processor to an operation mode in which power consumption is lower than a power consumption of an operation mode during creating the screen until at least the second period ends, when the first processor determines that the predicted termination timing has elapsed.

2. The data processing method according to claim 1, further comprising:
    creating the first images based on a first synchronization signal; and
    creating the second images based on a second synchronization signal that is sent subsequently to the first synchronization signal.

3. The data processing method according to claim 1, further comprising:
    suppressing execution of a process of switching the operation mode when a period between the termination timing of the creating process of second images and a termination timing of the second period is shorter than a threshold.

4. The data processing method according to claim 1, wherein at least one first image of the first images and at least one second image the second images are included in the screen created by an application to display on a display device.

5. The data processing method according to claim 1, wherein the determining includes:
    receiving a completion notification indicating that creation of at least one second image of the second images is completed each time when the at least one second image is created after a process of synthesizing the first images is executed during the second period;
    determining whether an accumulated number of the received completion notifications reaches the number of the first images each time when the completion notification is received; and
    determining that the predicted termination timing has elapsed when it is determined that the accumulated number of the received completion notifications reaches the number of the first images.

6. The data processing method according to claim 1, wherein the counting includes:
    receiving, from the second processor, a start notification indicating that a synthesis process of synthesizing the first images is started; and
    starting the counting when the start notification is received.

7. A data processing apparatus, comprising:
    a memory;
    a first processor coupled to the memory; and
    a second processor that performs a process of creating a screen and has a plurality of operation modes with different power consumption levels, wherein
    the first processor is configured to:

measure a number of first images created by the second processor during a first period corresponding to one of the predetermined time intervals, predict a termination timing of a creating process of second images executed by the second processor during a second period following the first period, the second images being images time-serially created after the first images, based on the number of first images created by the second processor during the first period, count a number of the second images time-serially created by the second processor during the second period after the second period is started, determine whether the predicted termination timing has elapsed based on the counted number of second images, and switch an operation mode of the second processor to an operation mode in which power consumption is lower than a power consumption of an operation mode during creating the screen until at least the second period ends, when the first processor determines that the predicted termination timing has elapsed.

8. The data processing apparatus according to claim 7, wherein the second processor is configured to create a first screen to be displayed on a display by performing a synthesis process of synthesizing the first images.

9. The data processing apparatus according to claim 8, wherein the synthesis process is completed before starting creating of the second images.

10. The data processing apparatus according to claim 8, wherein at least one first image of the first images is created based on a first synchronization signal, and at least one second image of the second images is created based on a second synchronization signal that is sent subsequently to the first synchronization signal.

11. The data processing apparatus according to claim 10, wherein
the first period is a period between a start time of the synthesis process performed based on the first synchronization signal and a start time of the synthesis process performed based on the second synchronization signal, and
the second period is a period between the start time of the synthesis process performed based on the second synchronization signal and a start time of the synthesis process performed based on a third synchronization signal that is sent subsequently to the second synchronization signal.

12. A non-transitory computer-readable storage medium storing a program that causes a first processor to execute a process, the first processor controlling a second processor that creates a screen in synchronization with synchronization signals generated at predetermined time intervals, the process comprising:

measuring a number of first images created by the second processor during a first period corresponding to one of the predetermined time intervals;

predicting a termination timing of a creating process of second images executed by the second processor during a second period following the first period, the second images being images time-serially created after the first images, based on the number of first images created by the second processor during the first period;

counting a number of the second images time-serially created by the second processor during the second period after the second period is started;

determining whether the predicted termination timing has elapsed based on the counted number of second images; and switching an operation mode of the second processor to an operation mode in which power consumption is lower than a power consumption of an operation mode during creation of the screen until at least the second period ends, when the first processor determines that the predicted termination timing has elapsed.

13. The storage medium according to claim 12, wherein the generating includes:
creating the first image based on a first synchronization signal; and
creating the second image based on a second synchronization signal that is sent subsequently to the first synchronization signal.

14. The storage medium according to claim 12, wherein the process further comprises suppressing execution of the switching the operation mode when a period between the termination timing of the creating process of second images and a termination timing of the second period is shorter than a threshold.

* * * * *